(12) United States Patent
Nakamura

(10) Patent No.: US 12,306,490 B2
(45) Date of Patent: May 20, 2025

(54) DISPLAY DEVICE AND COVER GLASS

(71) Applicant: Japan Display Inc., Tokyo (JP)

(72) Inventor: Tenfu Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/809,430

(22) Filed: Aug. 20, 2024

(65) Prior Publication Data

US 2024/0411169 A1    Dec. 12, 2024

Related U.S. Application Data

(63) Continuation of application No. 18/522,476, filed on Nov. 29, 2023, now Pat. No. 12,105,369.

(30) Foreign Application Priority Data

Nov. 29, 2022    (JP) ................... 2022-190520

(51) Int. Cl.
  *G02F 1/1333*   (2006.01)
  *G02F 1/1335*   (2006.01)
  *G02F 1/1334*   (2006.01)
  *G02F 1/13357*  (2006.01)

(52) U.S. Cl.
  CPC ............... *G02F 1/133331* (2021.01); *G02F 1/133553* (2013.01); *G02F 1/133607* (2021.01); *G02F 1/1334* (2013.01); *G02F 1/133615* (2013.01)

(58) Field of Classification Search
  CPC ............. G02F 1/133615; G02F 1/133331

USPC ........................................ 349/56
See application file for complete search history.

(56) References Cited

U.S. PATENT DOCUMENTS

| | | | |
|---|---|---|---|
| 2011/0116013 | A1 | 5/2011 | Sano et al. |
| 2019/0302496 | A1 | 10/2019 | Okuyama |
| 2021/0311364 | A1 | 10/2021 | Ikeda |
| 2021/0405465 | A1 | 12/2021 | Nakamura et al. |
| 2022/0179269 | A1 | 6/2022 | Ikeda et al. |
| 2023/0011603 | A1 | 1/2023 | Choi |

FOREIGN PATENT DOCUMENTS

| | | | |
|---|---|---|---|
| DE | 102017205959 A1 | * | 10/2018 |
| JP | 2011-107229 A | | 6/2011 |
| JP | 2019-174531 A | | 10/2019 |
| JP | 2020-148955 A | | 9/2020 |
| JP | 2021-033017 A | | 3/2021 |

* cited by examiner

*Primary Examiner* — Christopher M Raabe
(74) *Attorney, Agent, or Firm* — Maier & Maier, PLLC

(57) ABSTRACT

According to one embodiment, a display device includes a first substrate, a second substrate opposed to the first substrate, a liquid crystal layer provided between the first substrate and the second substrate, a first cover glass having a first main surface opposed to the second substrate, a second main surface on a side opposite to the first main surface, a first side surface connecting the first main surface with the second main surface, and a second side surface on a side opposite to the first side surface, and a light source provided on the first side surface side. A thickness of the first cover glass on the first side surface side is different from a thickness of the first cover glass on the second side surface side.

20 Claims, 16 Drawing Sheets

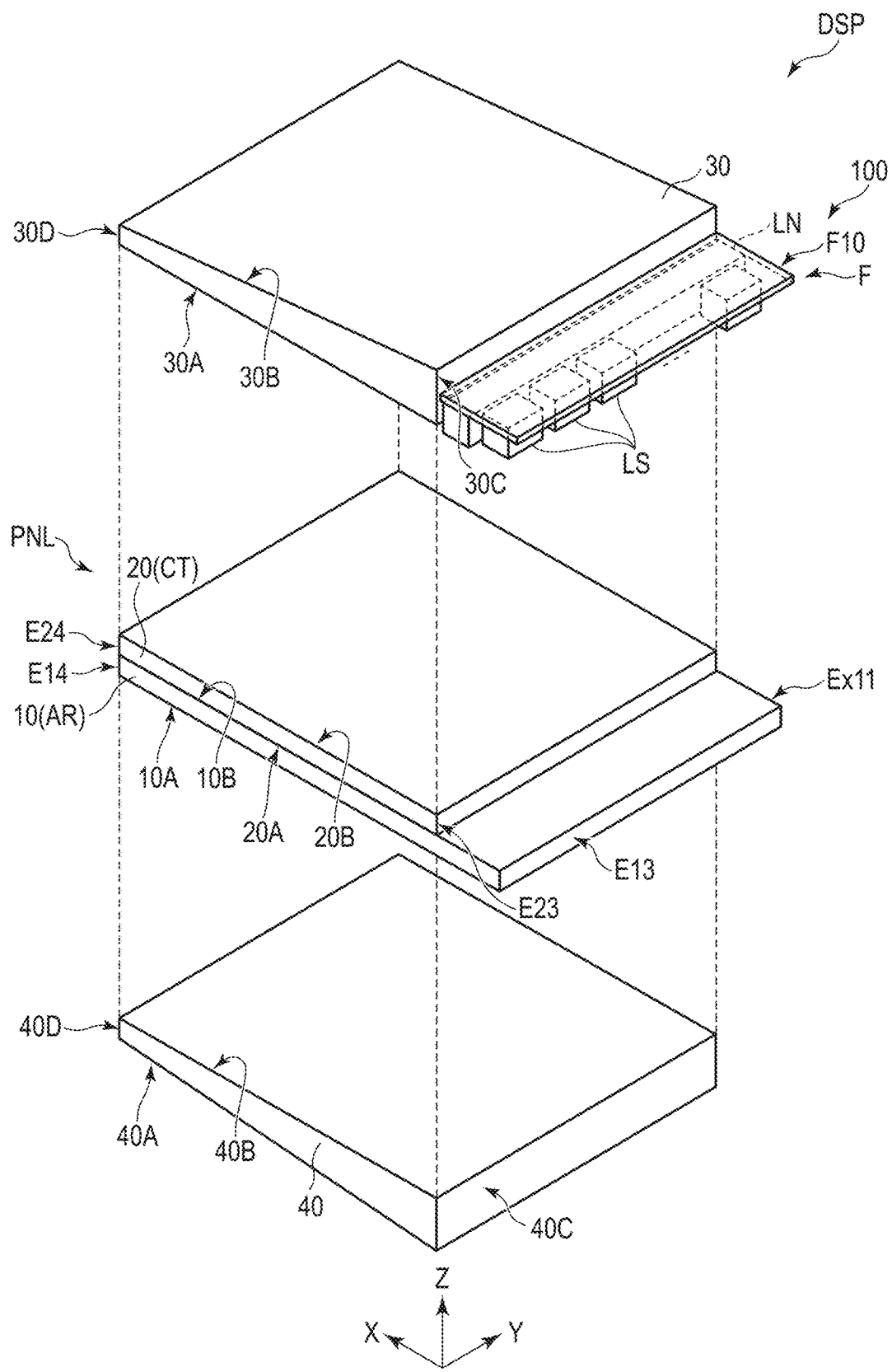
F I G. 3

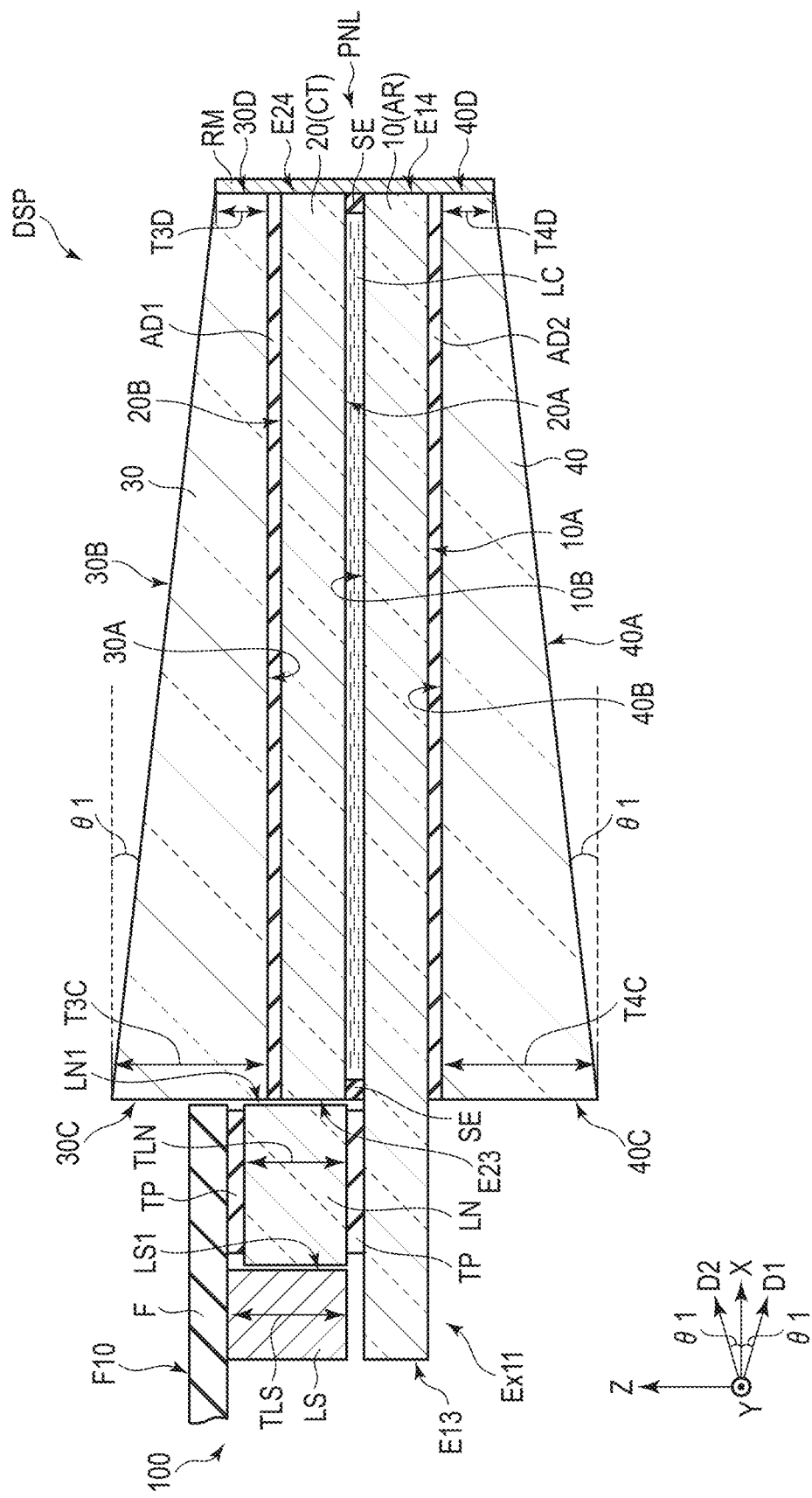
F I G. 4

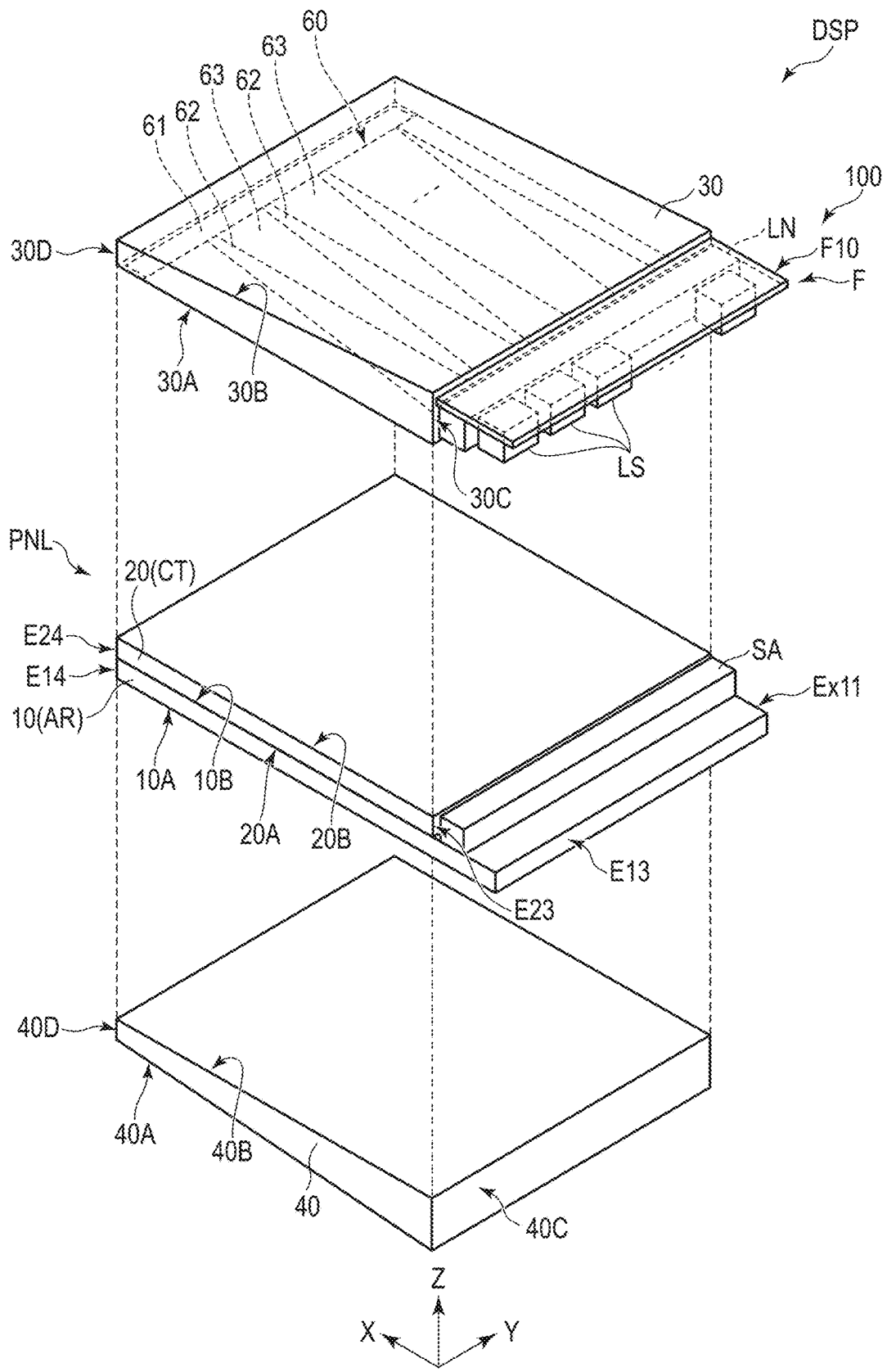
F I G. 8

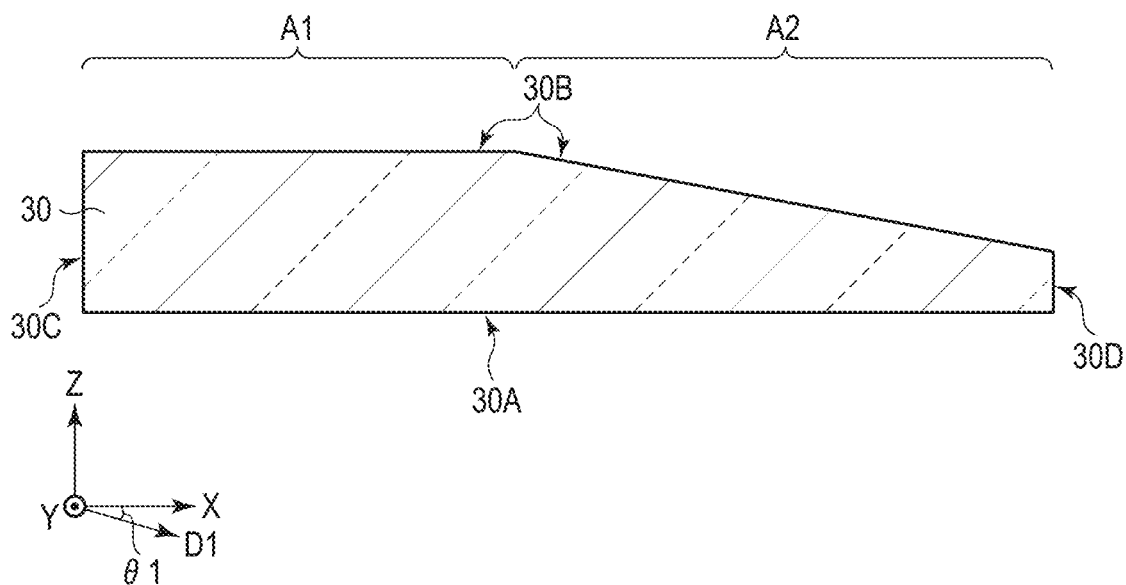
F I G. 16
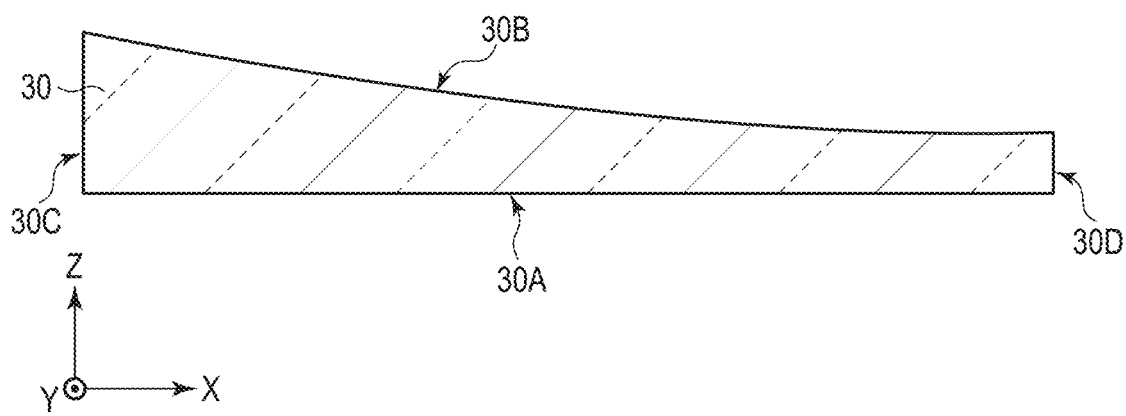
F I G. 17

DISPLAY DEVICE AND COVER GLASS

CROSS-REFERENCE TO RELATED APPLICATIONS

This application is a Continuation of U.S. application Ser. No. 18/522,476, filed on Nov. 29, 2023, and based upon and claims the benefit of priority from Japanese Patent Application No. 2022-190520, filed Nov. 29, 2022, the entire contents of each of which are incorporated herein by reference.

FIELD

Embodiments described herein relate generally to a display device and a cover glass.

BACKGROUND

In recent years, a display device comprising a display panel including a polymer dispersed liquid crystal layer (PDLC) has been proposed. The polymer dispersed liquid crystal layer can switch a scattering state in which light is scattered and a transparent state in which light is transmitted. The display device can display images by switching the display panel to the scattering state. In contrast, the user can visually recognize a background through the display panel by switching the display panel to the transparent state.

BRIEF DESCRIPTION OF THE DRAWINGS

FIG. 3 is an exploded perspective view showing main portions of the display device shown in FIG. 1.

FIG. 4 is a cross-sectional view schematically showing the display device according to the first embodiment.

FIG. 8 is an exploded perspective view showing a main portions of a display device according to a fifth embodiment.

FIG. 16 is a cross-sectional view schematically showing an example of a shape applicable to a cover glass.

FIG. 17 is a cross-sectional view schematically showing another example of a shape applicable to a cover glass.

DETAILED DESCRIPTION

Figure 1:
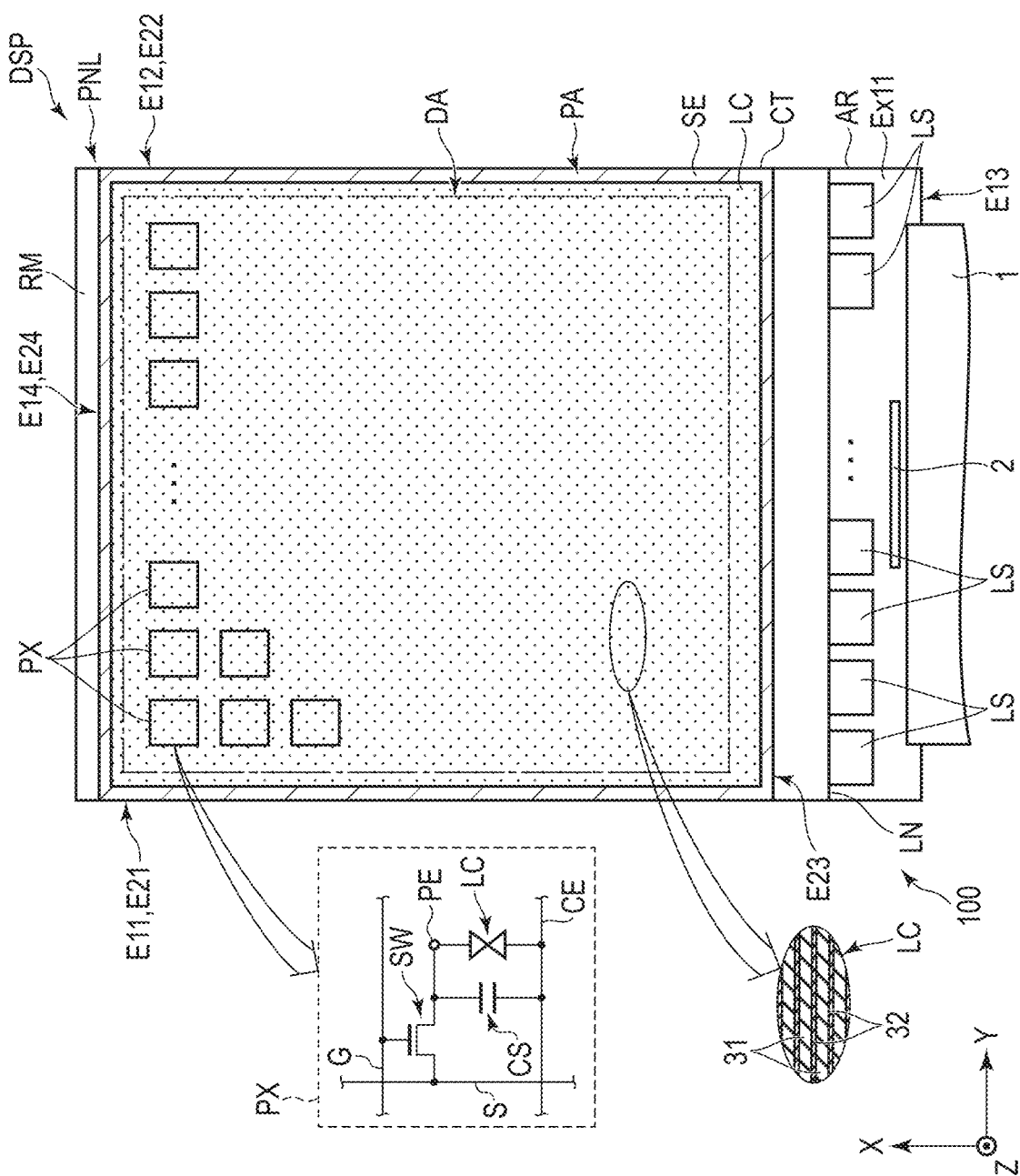
FIG. 1 is a plan view showing a configuration example of a display device according to a first embodiment.

In general, according to one embodiment, a display device comprises a first substrate, a second substrate opposed to the first substrate, a liquid crystal layer provided between the first substrate and the second substrate, a first cover glass having a first main surface opposed to the second substrate, a second main surface on a side opposite to the first main surface, a first side surface connecting the first main surface with the second main surface, and a second side surface on a side opposite to the first side surface, and a light source provided on the first side surface side. A thickness of the first cover glass on the first side surface side is different from a thickness of the first cover glass on the second side surface side.

According to another embodiment, a display device comprises a display panel displaying an image, a first cover glass overlapping with the display panel and having a first side surface, and a light source provided on the first side surface side. A thickness including the first cover glass and the display panel in an area close to the light source is different from a thickness including the first cover glass and the display panel in an area separated from the light source.

According to yet another embodiment, a cover glass is stacked on a display panel displaying an image. The cover glass has a first main surface opposed to the display panel, a second main surface on a side opposite to the first main surface, a first side surface bonding the first main surface with the second main surface, and a second side surface on a side opposite to the first main surface. A thickness on the first side surface side is different from a thickness on the second side surface side.

According to the embodiments, a display device and a cover glass capable of suppressing the degradation in display quality can be provided.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the drawings are schematically illustrated as compared to the actual modes, but the schematic illustration merely shows an example and adds no restriction to the interpretation of the invention.

In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each of the embodiments, a first direction X, a second direction Y, and a third direction Z are defined as shown in each of the drawings. The first direction X, the second direction Y, and the third direction Z are orthogonal to each other, but may intersect each other at an angle other than 90 degrees. In addition, the third direction Z is defined as an upper or upward direction while a direction opposite to the third direction Z is defined as a lower or downward direction, in the embodiments.

Expressions such as "a second component above a first component" and "a second component beneath a first component" mean that the second component may be in contact with the first component or may be located apart from the first component. Viewing an X-Y plane defined by the first direction X and the second direction Y is hereinafter referred to as plan view.

In each of the embodiments, a liquid crystal display device which enables a background to be visually recognized, to which polymer dispersed liquid crystal is applied, is disclosed as an example of the display device. Incidentally, each embodiment does not prevent application of individual technical ideas disclosed in each embodiment to other types of display devices.

First Embodiment

FIG. 1 is a plan view showing a configuration example of a display device DSP according to the present embodiment. The display device DSP comprises a display panel PNL including a polymer dispersed liquid crystal layer (hereinafter simply referred to as a liquid crystal layer LC), a wiring board 1, an IC chip 2, a light source unit 100, and a reflective material RM.

The display panel PNL includes an array substrate AR, a counter-substrate CT opposed to the array substrate AR, a liquid crystal layer LC, and a seal SE. In the present embodiment, the array substrate AR serves as a first substrate and the counter-substrate CT serves as a second substrate.

The array substrate AR and the counter-substrate CT are formed in flat plate shapes parallel to the X-Y plane. The array substrate AR and the counter-substrate CT overlap in plan view. The array substrate AR and the counter-substrate CT are bonded to each other with the seal SE.

The liquid crystal layer LC is arranged between the array substrate AR and the counter-substrate CT and is sealed by the seal SE. In FIG. 1, the liquid crystal layer LC is represented by dots and the seal SE is represented by hatch lines.

As enlarged and schematically shown in FIG. 1, the liquid crystal layer LC contains polymer 31 and liquid crystal molecules 32. As one example, the polymer 31 is liquid crystal polymer. The polymer 31 is formed in a stripe shape extending along the second direction Y and is aligned in the first direction X.

The liquid crystal molecules 32 are dispersed in gaps of the polymer 31 and aligned such that their long axes extend along the second direction Y. The polymer 31 and the liquid crystal molecules 32 have optical anisotropy or refractive anisotropy. The response performance of the polymer 31 to the electric field is lower than the response performance of the liquid crystal molecules 32 to the electric field.

As one example, the alignment direction of the polymers 31 is hardly varied irrespective of the presence or absence of the electric field. In contrast, the alignment direction of the liquid crystal molecules 32 changes in accordance with the electric field in a state in which a voltage higher than or equal to a threshold value is applied to the liquid crystal layer LC.

For example, in a state in which the voltage is not applied to the liquid crystal layer LC, optical axes of the polymer 31 and the liquid crystal molecules 32 are parallel to each other, and the light made incident on the liquid crystal layer LC is not substantially scattered in the liquid crystal layer LC but is transmitted (transparent state).

In a state in which the voltage is applied to the liquid crystal layer LC, the optical axes of the polymer 31 and the liquid crystal molecules 32 intersect one another and the light made incident on the liquid crystal layer LC is scattered in the liquid crystal layer LC (scattered state). In other words, in the liquid crystal layer LC, the transparent state and the scattered state can be switched in accordance with the applied voltage.

The display panel PNL includes a display area DA in which images are displayed and a surrounding area PA which surrounds the display area DA. The seal SE is located in the surrounding area PA. The display area DA includes pixels PX arrayed in a matrix in the first direction X and the second direction Y.

As shown and enlarged in FIG. 1, each pixel PX comprises a switching element SW, a pixel electrode PE, a common electrode CE, a liquid crystal layer LC, and the like. The switching element SW is constituted by, for example, a thin-film transistor (TFT) and is electrically connected to a scanning line G and a signal line S.

The scanning line G is electrically connected to the switching element SW in each of the pixels PX arranged in the second direction Y. The signal line S is electrically connected to the switching element SW in each of the pixels PX arranged in the first direction X.

The pixel electrode PE is electrically connected to the switching element SW. The common electrode CE is provided commonly to a plurality of pixel electrodes PE. The liquid crystal layer LC (particularly, liquid crystal molecules 32) is driven by an electric field produced between the pixel electrode PE and the common electrode CE. A capacitor CS is formed, for example, between the common electrode CE and an electrode having the same potential and between the pixel electrode PE and an electrode having the same potential.

The scanning line G, the signal line S, the switching element SW, and the pixel electrode PE are provided on the array substrate AR, and the common electrode CE is provided on the counter-substrate CT, which will be described with reference to FIG. 2. On the array substrate AR, the scanning line G and the signal line S are electrically connected to the wiring board 1 or the IC chip 2.

The array substrate AR has a pair of side surfaces E11 and E12 extending in the first direction X and a pair of side surfaces E13 and E14 extending in the second direction Y. In the example shown in FIG. 1, the pair of side surfaces E11 and E12 are side surfaces formed along the long sides of the display panel PNL, and the pair of side surfaces E13 and E14 are side surfaces formed along the short sides of the display panel PNL.

The counter-substrate CT has a pair of side surfaces E21 and E22 extending in the first direction X and a pair of side surfaces E23 and E24 extending in the second direction Y. In the example shown in FIG. 1, the pair of side surfaces E21 and E22 are side surfaces formed along the long sides, and the pair of side surfaces E23 and E24 are side surfaces formed along the short sides.

In the example shown in FIG. 1, the side surface E11 overlaps with the side surface E21 in plan view, but may not overlap with the side surface E21. In the example shown in FIG. 1, the side surface E12 overlaps with the side surface E22 in plan view, but may not overlap with the side surface E22. In the example shown in FIG. 1, the side surface E14 overlaps with the side surface E24 in plan view, but may not overlap with the side surface E24.

The array substrate AR includes an extending portion Ex11 which extends beyond the side surface E23 of the counter-substrate CT. From another viewpoint, the extending portion Ex11 does not overlap with the counter-substrate CT. The extending portion Ex11 is located between the side surface E13 and the side surface E23. The wiring board 1 and the IC chip 2 are mounted on the extending portion Ex11.

The wiring board 1 is, for example, a flexible printed circuit which can be bent. The IC chip 2 incorporates, for example, a display driver which outputs signals necessary for image display, and the like. The IC chip 2 may be mounted on the wiring board 1.

In the example shown in FIG. 1, the display device DSP comprises a single wiring board 1, but may comprise a plurality of wiring boards. The display device DSP comprises a single IC chip 2, but may comprise a plurality of IC chips.

In the example shown in FIG. 1, the light source unit 100 overlaps with the extending portion Ex11 in plan view. The light source unit 100 includes a plurality of light sources LS and a lens LN. The plurality of light sources LS are spaced apart and arranged in the second direction Y.

In the light sources LS, red LEDs, green LEDs, and blue LEDs are continuously aligned. The light sources LS are not limited to an arrangement in which LEDs of three different colors are continuously aligned but, for example, only white light sources emitting white light may be continuously aligned.

The lens LN (for example, prism lens) is formed in a transparent rod shape and extends in the second direction Y. The lens LN is formed of, for example, resin. The lens LN has, for example, a plurality of curved surfaces corresponding to the plurality of light sources LS. The lens LN may be composed of a plurality of lenses. The number of light sources LS and the number of lenses LN are not limited to the examples shown in the figure.

The reflective material RM is provided on the side opposite to the light source unit 100 in the first direction X. The reflective material RM is provided along the second direction Y. The reflective material RM is formed of, for example, a metal material having a light reflectivity, such as silver. The reflective material RM is, for example, a reflective tape.

Figure 2:
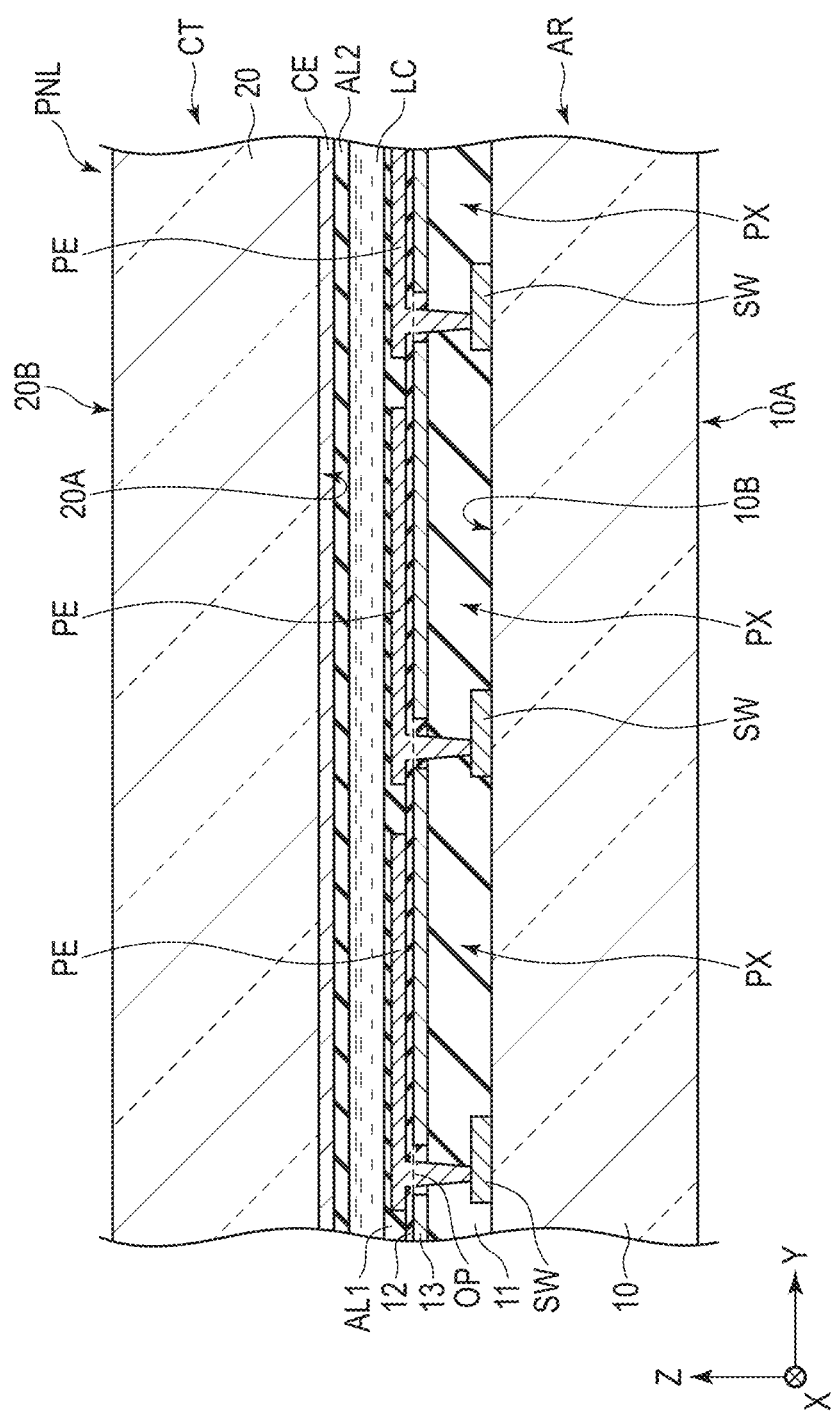
FIG. 2 is a cross-sectional view showing a configuration example of the display panel shown in FIG. 1.

FIG. 2 is a cross-sectional view showing a configuration example of the display panel PNL shown in FIG. 1. The array substrate AR includes a transparent substrate 10, insulating films 11 and 12, a capacitive electrode 13, switching elements SW, the pixel electrodes PE, and an alignment film AL1. The transparent substrate 10 has a main surface 10A and a main surface 10B on a side opposite to the main surface 10A.

The switching elements SW are provided on the main surface 10B side. The insulating film 11 is provided on the main surface 10B and covers the switching elements SW. The scanning lines G and the signal lines S described with reference to FIG. 1 are provided between the transparent substrate 10 and the insulating film 11, but their illustration is omitted here. The capacitive electrode 13 is provided between the insulating films 11 and 12.

The pixel electrode PE is provided between the insulating film 12 and the alignment film AL1, in each of the pixels PX. From another viewpoint, the capacitive electrode 13 is provided between the transparent substrate 10 and the pixel electrodes PE.

The pixel electrodes PE are electrically connected to the switching elements SW through opening portions OP of the capacitive electrode 13. The pixel electrodes PE overlap with the capacitive electrode 13 through the insulating film 12 and form the capacitor CS of the pixel PX. The alignment film AL1 covers the pixel electrodes PE.

The counter-substrate CT includes a transparent substrate 20, a common electrode CE, and an alignment film AL2. The transparent substrate 20 has a main surface 20A and a main surface 20B on a side opposite to the main surface 20A. The main surface 20A of the transparent substrate 20 is opposed to the main surface 10B of the transparent substrate 10.

The common electrode CE is provided on the main surface 20A. The alignment film AL2 covers the common electrode CE. The liquid crystal layer LC is located between the main surface 10B and the main surface 20A and is in contact with the alignment films AL1 and AL2.

In the counter-substrate CT, a light-shielding layer may be provided just above each of the switching elements SW, the scanning lines G, and the signal lines S. A transparent insulating film may be provided between the transparent substrate 20 and the common electrode CE or between the common electrode CE and the alignment film AL2.

The common electrode CE is arranged over the plurality of pixels PX and is opposed to the plurality of pixel electrodes PE. The common electrode CE has the same potential as the capacitive electrode 13. The liquid crystal layer LC is located between the pixel electrodes PE and the common electrode CE.

The transparent substrates 10 and 20 are, for example, glass substrates but may be insulating substrates such as plastic substrates. The main surfaces 10A and 10B, and the main surfaces 20A and 20B are the surfaces substantially parallel to the X-Y plane.

In this case, being substantially parallel means being parallel in a design concept and indicates including variation in angle caused by a manufacturing process since implementing an ideal parallel state in the manufacturing is difficult.

The insulating film 11 includes, for example, a transparent inorganic insulating film of silicon oxide, silicon nitride, silicon oxynitride or the like, and a transparent organic insulating film of acrylic resin or the like. The insulating film 12 is, for example, a transparent inorganic insulating film of silicon nitride or the like. The capacitive electrode 13, the pixel electrodes PE, and the common electrode CE are, for example, transparent electrodes formed of a transparent conductive material such as indium tin oxide (ITO) or indium zinc oxide (IZO).

The alignment films AL1 and AL2 are horizontal alignment films having an alignment restriction force substantially parallel to the X-Y plane. As an example, the alignment films AL1 and AL2 are subjected to alignment treatment in the second direction Y. Incidentally, the alignment treatment may be a rubbing treatment or an optical alignment treatment.

FIG. 3 is an exploded perspective view showing main portions of the display device DSP shown in FIG. 1. In FIG. 3, the reflective material RM and the like are partially omitted. As described with reference to FIG. 1, the display device DSP comprises the display panel PNL and the light source unit 100.

The display device DSP further comprises a cover glass 30 and a cover glass 40. In the present embodiment, the cover glass 30 corresponds to a first cover glass, and the cover glass 40 corresponds to a second cover glass.

The cover glass 30 is opposed to the counter-substrate CT, and the cover glass 40 is opposed to the array substrate AR. The cover glass 40, the array substrate AR, the counter-substrate CT, and the cover glass 30 are aligned in this order along the third direction Z. The cover glasses 30 and 40 do not overlap with the extending portion Ex11 in the third direction Z.

The cover glasses 30 and 40 are, for example, glass substrates formed of transparent glass. The cover glasses 30 and 40 have an approximately rectangular shape in plan view. In the example shown in FIG. 3, the size of the cover glass 30 is substantially equal to the size of the cover glass 40 in plan view. The size of the cover glass 30 may be larger or smaller than the size of the cover glass 40 in plan view.

The size of the cover glass 30 is substantially equal to the size of the transparent substrate 20 in plan view. The cover glass 30 has a main surface 30A (first main surface), a main surface 30B (second main surface) on a side opposite to the main surface 30A, a side surface 30C (first side surface) that connects the main surface 30A with the main surface 30B, and a side surface 30D (second side surface) on a side opposite to the side surface 30C.

The main surface 30A is opposed to the main surface 20B of the transparent substrate 20. The main surface 30A is a surface substantially parallel to the X-Y plane. The main surface 30B is an inclined surface that is inclined to the main surface 30A. From another viewpoint, the main surface 30B is inclined to the X-Y plane.

The side surfaces 30C and 30D are surfaces substantially parallel to an X-Z plane defined by the second direction Y and the third direction Z. From another viewpoint, an angle formed between the main surface 30A and the side surface 30C, and an angle formed between the main surface 30A and the side surface 30D are approximately 90 degrees.

In the first direction X, the side surface 30D is located on a side opposite to the side surface 30C. The side surface 30C side where the light source unit 100 is located is referred to as an incidence side, and the side surface 30D side opposite to the side surface 30C side is referred to as an opposite incidence side, in some cases.

The cover glass 40 overlaps with the display panel PNL on a side opposite to the cover glass 30 in the third direction Z. The cover glass 40 has a main surface 40A (fourth main surface), a main surface 40B (third main surface) on a side opposite to the main surface 40A, a side surface 40C (third side surface) that connects the main surface 40A with the main surface 40B, and a side surface 40D (fourth side surface) on a side opposite to the side surface 40C.

The main surface 40B is opposed to the main surface 10A of the transparent substrate 10. The main surface 40B is a surface substantially parallel to the X-Y plane. The main surface 40A is an inclined surface that is inclined to the main surface 40B. From another viewpoint, the main surface 40A is inclined to the X-Y plane.

The side surfaces 40C and 40D are the surfaces substantially parallel to the Y-Z plane. From another viewpoint, an angle formed between the main surface 40B and the side surface 40C, and an angle formed between the main surface 40B and the side surface 40D are approximately 90 degrees.

In the first direction X, the side surface 40C is located on the side surface 30C side. In the first direction X, the side surface 40D is located on a side opposite to the side surface 40C. A direction from the side surface 30C (side surface 40C) to the side surface 30D (side surface 40D) corresponds to the first direction X.

As described with reference to FIG. 1, the light source unit 100 includes the light sources LS and the lens LN. The light source unit 100 further includes a wiring board F. The plurality of light sources LS are mounted on the wiring board F.

The wiring board F is, for example, a printed circuit board and is more rigid than the wiring board 1 shown in FIG. 1. The wiring board F has an upper surface F10. The upper surface F10 is a surface on a side opposite to the surface on which the plurality of light sources LS are mounted.

In the first direction X, the light source unit 100 is provided between the side surface 30C and the side surface E13. In the first direction X, the light source unit 100 is provided on the side surface 30C side. The plurality of light sources LS and the lens LN are provided between the extending portion Ex11 and the wiring board F in the third direction Z. The transparent substrate 10, the light sources LS, and the wiring board F are arranged in this order along the second direction Y.

FIG. 4 is a cross-sectional view schematically showing the display device DSP according to the present embodiment. In FIG. 4, the wiring board 1, the IC chip 2, and the like are omitted. Incidentally, the only main parts of the display panel PNL are simplified and illustrated.

The display device DSP further comprises an adhesive layer AD1 and an adhesive layer AD2. The adhesive layer AD1 is located between the display panel PNL and the cover glass 30, and the adhesive layer AD2 is located between the display panel PNL and the cover glass 40, in the third direction Z.

The adhesive layer AD1 bonds the cover glass 30 to the display panel PNL. From another viewpoint, the adhesive layer AD1 is in contact with the main surface 30A of the cover glass 30 and the main surface 20B of the transparent substrate 20.

The adhesive layer AD2 bonds the display panel PNL to the cover glass 40. From another viewpoint, the adhesive layer AD2 is in contact with the main surface 10A of the transparent substrate 10 and the main surface 40B of the cover glass 40.

The adhesive layers AD1 and AD2 are transparent and are formed of, for example, optical clear adhesive (OCA). The adhesive layers AD1 and AD2 may be formed of optical clear resin (OCR).

The refractive index of each of the transparent substrates 10 and 20, the adhesive layers AD1 and AD2, and the cover glasses 30 and 40 is equivalent. In this example, "equivalent" is not limited to a case where the difference in refractive index is zero, but implies a case where the difference in refractive index is 0.03 or less.

An end of the wiring board F is opposed to the side surface 30C. The lens LN is located between the cover glass 30 and the light source LS and between the transparent substrate 20 and the light source LS. From another viewpoint, a side surface LN1 of the lens LN is opposed to the side surface E23 and the side surface 30C.

The lens LN is bonded to the wiring board F by an adhesive material TP, and bonded to the main surface 10B on the extending portion Ex11 by the adhesive material TP. The adhesive material TP is, for example, a double-sided tape.

The light source LS is opposed to the side surface E23 and the side surface 30C through the lens LN, in the first direction X. The light source LS emits light toward the side surface E23 and the side surface 30C. The light emitted from the light source LS travels along a direction of an arrow indicative of the first direction X.

The side surface 30C is located directly above the side surface E23, and the side surface 30D is located directly above the side surface E24, in the third direction Z. The side surface 40C is located directly below the side surface 30C, in the third direction Z. The side surface 40D is located directly below the side surface 30D, in the third direction Z, but may be displaced.

The side surface 40D, the side surface E14, the side surface E24, and the side surface 30D are aligned along the third direction Z, but may be displaced. The reflective material RM is provided along the third direction Z, from the side surface 40D to the side surface 30D.

As described with reference to FIG. 3, the main surface 30B is an inclined surface that is inclined to the main surface 30A. The main surface 30B is inclined in a direction different from the first direction X and the third direction Z. For example, a direction intersecting the first direction X clockwise at an acute angle, in side surface view of seeing the X-Z plane defined by the first direction X and the third direction Z, is defined as a direction D1. The main surface 30B extends along the direction D1.

The cover glass 30 has a thickness which decreases as the distance from the light source LS increases along the first direction X. In the example shown in FIG. 4, the thickness of the cover glass 30 decreases at a constant rate as the distance from the light source LS increases.

In this example, the thickness refers to the length along the third direction Z. The main surface 30B is closer to the display panel PNL as the distance from the light source LS increases. In other words, the thickness of the cover glass 30 on the side surface 30C side is different from the thickness of the cover glass 30 on the side surface 30D side.

The thickness of the cover glass 30 on the side surface 30C side and near the side surface 30C side is defined as the thickness of the cover glass 30 on the side surface 30C side, and the thickness of the cover glass 30 on the side surface 30D side and near the side surface 30D side is defined as the thickness of the cover glass 30 on the side surface 30D side.

For example, in the cover glass 30, the side surface 30C and the vicinity of the side surface 30C correspond to the area close to the light source LS, and the side surface 30D and the vicinity of the side surface 30D correspond to the area separated from the light source LS.

In the present embodiment, the thickness of the cover glass 30 on the side surface 30C side is greater than the thickness of the cover glass 30 on the side surface 30D side. For example, a thickness T3C of the cover glass 30 on the side surface 30C is the greatest and a thickness T3D of the cover glass 30 on the side surface 30D is the smallest.

For example, the thickness T3C of the cover glass 30 on the side surface 30C is approximately 2 to 3 mm, and the thickness T3D of the cover glass 30 on the side surface 30D is approximately 1 mm or more. In one example, the thickness T3D of the cover glass 30 on the side surface 30D may be almost half of the thickness T3C of the cover glass 30 on the side surface 30C. Incidentally, the thickness T3D of the cover glass 30 on the side surface 30D may be greater or less than half the thickness T3C of the cover glass 30 on the side surface 30C.

An angle θ1 between the first direction X and the direction D1 is several degrees or, in one example, 2 degrees or less. By setting such an angle θ1, light which does not satisfy the total reflection conditions at the interface between the cover glass 30 and the air layer, of the light traveling inside the cover glass 30, can hardly be generated.

For example, the angle θ1 is 0.637 degrees if the length of the cover glass 30 along the first direction X is 123.65 mm, the thickness T3C of the cover glass 30 on the side surface 30C is 2.75 mm, and the thickness T3D of the cover glass 30 on the side surface 30D is 1.375 mm. The cover glass 30 has a constant thickness in the second direction Y.

For example, the thickness T3C of the cover glass 30 on the side surface 30C is greater than the thickness of each of the transparent substrates 10 and 20. For example, the thickness T3D of the cover glass 30 on the side surface 30D is smaller than the thickness of each of the transparent substrates 10 and 20.

For example, the thickness T3C of the cover glass 30 on the side surface 30C is greater than the thickness of the display panel PNL, and the thickness T3D of the cover glass 30 on the side surface 30D is smaller than the thickness of the display panel PNL. In the example shown in FIG. 4, the thickness of each of the transparent substrate 10 and the transparent substrate 20 is approximately equal. The thickness of each of the transparent substrates 10 and 20 is, for example, 0.7 mm.

Since the display device DSP comprises the cover glass 30, the thickness including the cover glass 30 and the display panel PNL in the area close to the light source LS is different from the thickness including the cover glass 30 and the display panel PNL in the area separated from the light source LS. The thickness including the cover glass 30 and the display panel PNL is the distance from the main surface 10A of the transparent substrate 10 to the main surface 30B of the cover glass 30 in the third direction Z.

In the present embodiment, the thickness including the cover glass 30 and the display panel PNL decreases at a constant rate as the distance from the light source LS increases along the first direction X. In other words, the thickness including the cover glass 30 and the display panel PNL in the area close to the light source LS is greater than the thickness including the cover glass 30 and the display panel PNL in the area separated from the light source LS.

The distance from the main surface 20A of the transparent substrate 20 to the main surface 30B of the cover glass 30 in the third direction Z is greater than, for example, a thickness TLS of the light source LS and a thickness TLN of the lens LN. An entire surface of an emission surface LS1 of the light source LS is opposed to the side surface E23 and the side surface 30C with the lens LN interposed therebetween.

From another viewpoint, the cover glass 30 has a portion located above the light source LS. Furthermore, the cover glass 30 has a portion located above the upper surface F10 of the wiring board F.

As described with reference to FIG. 3, the main surface 40A is an inclined surface that is inclined to the main surface 40B. The main surface 40A is inclined in a direction different from the first direction X and the third direction Z. In side surface view, for example, a direction which intersects the first direction X counterclockwise at an acute angle is defined as a direction D2. The main surface 40A extends along the direction D2. The main surface 30B and the main surface 40A are inclined to a direction of being close to each other along the first direction X.

The cover glass 40 has a thickness which decreases as the distance from the light source LS increases along the first direction X. In the example shown in FIG. 4, the thickness of the cover glass 40 decreases at a constant rate as the distance from the light source LS increases. The main surface 40A is closer to the display panel PNL as the distance from the light source LS increases.

In other words, the thickness of the cover glass 40 on the side surface 40C side is different from the thickness of the cover glass 40 on the side surface 40D side. The thickness of the cover glass 40 on the side surface 40C side and near the side surface 40C side is defined as the thickness of the cover glass 40 on the side surface 40C side, and the thickness of the cover glass 40 on the side surface 40D side and near the side surface 40D side is defined as the thickness of the cover glass 40 on the side surface 40D side.

For example, in the cover glass 40, the side surface 40C and the vicinity of the side surface 40C correspond to the area close to the light source LS, and the side surface 40D and the vicinity of the side surface 40D correspond to the area separated from the light source LS.

In the present embodiment, the thickness of the cover glass 40 on the side surface 40C side is greater than the thickness of the cover glass 40 on the side surface 40D side. For example, a thickness T4C of the cover glass 40 on the side surface 40C is the greatest and a thickness T4D of the cover glass 40 on the side surface 40D is the smallest.

For example, the cover glass 40 is constituted to have the same size as the cover glass 30. The thickness T4C of the cover glass 40 on the side surface 40C is equal to the thickness T3C of the cover glass 30 on the side surface 30C, and the thickness T4D of the cover glass 40 on the side surface 40D is equal to the thickness T3D of the cover glass 30 on the side surface 30D. The angle formed between the first direction X and the direction D2 is equal to, for example, the angle θ1.

Incidentally, the cover glass 40 may not be constituted to have the same size as the cover glass 30. For example, the angle formed between the first direction X and the direction D1 may be different from the angle formed between the first direction X and the direction D2.

In the display device DSP, the thickness of the display device DSP in the area close to the light source LS, of the area overlapping with the cover glasses 30 and 40, is different from the thickness of the display device DSP in the area separated from the light source LS. The thickness of the display device DSP is the distance from the main surface 40A to the main surface 30B in the third direction Z.

In the present embodiment, the thickness of the display panel PNL decreases at a constant rate as the distance from the light source LS increases along the first direction X. In other words, the thickness of the display device DSP in the area close to the light source LS is greater than the thickness of the display device DSP in the area separated from the light source LS.

Next, the light emitted from the light source LS will be described. The light emitted from the light source LS is moderately diffused on the lens LN, and is made incident on the transparent substrate 20 from the side surface E23 and incident on the cover glass 30 from the side surface 30C.

The light traveling toward the main surface 30B, of the light made incident on the cover glass 30, is reflected on an interface between the cover glass 30 and the air layer. The light traveling from the cover glass 30 toward the transparent substrate 20, of the light made incident on the cover glass 30, is made incident on the display panel PNL through the adhesive layer AD1.

The light traveling from the transparent substrate 20 toward the cover glass 30, of the light made incident on the transparent substrate 20, is made incident on the cover glass 30 through the adhesive layer AD1 and is reflected at the interface between the cover glass 30 and the air layer.

The light made incident on the display panel PNL is transmitted through the transparent substrate 20, the liquid crystal layer LC, and the transparent substrate 10 in this order. The light transmitted through the transparent substrate 10, of the light made incident on the display panel PNL, is made incident on the cover glass 40 through the adhesive layer AD2. After reflected at the interface between the main surface 40A and the air layer, the light travels toward the display panel PNL.

Thus, the light made incident from the side surface E23 and the side surface 30C travels along the first direction X while repeatedly reflected at the interface between the cover glass 30 and the air layer and the interface between the cover glass 40 and the air layer.

Since the refractive index of the adhesive layer AD1 is equivalent to that of the transparent substrate 20 and the cover glass 30, the light is hardly reflected at the interface between the transparent substrate 20 and the adhesive layer AD1 and between the cover glass 30 and the adhesive layer AD1.

Since the refractive index of the adhesive layer AD2 is equivalent to that of the transparent substrate 10 and the cover glass 40, the light is hardly reflected at the interface between the transparent substrate 10 and the adhesive layer AD2 and between the cover glass 40 and the adhesive layer AD2.

Furthermore, since the reflective material RM is provided on the side opposite to the light source unit 100, the light reaching the side surface 30D and the side surface 40D is scattered and reflected by the reflective material RM to travel toward the direction opposite to the first direction X. By providing the reflective material RM, the light leakage to the outside is suppressed, and the light utilization efficiency is improved by reusing the light.

The light made incident on the liquid crystal layer LC to which no voltage is applied is transmitted through the liquid crystal layer LC while hardly scattered. In contrast, the light made incident on the liquid crystal layer LC to which the voltage is applied is scattered in the liquid crystal layer LC. The display device DSP allows images to be observed from the main surface 30B side and also allows images to be observed from the main surface 40A side.

The display device DSP is a so-called transparent display, and even when the display device DSP is observed from the main surface 30B side or observed from the main surface 40A side, a background of the display device DSP can be observed through the display device DSP.

According to the display device DSP configured as described above, the display device DSP comprises the cover glass 30. In the cover glass 30, the thickness on the side surface 30C side is different from the thickness on the side surface 30D side. In the present embodiment, the thickness of the cover glass 30 on the side surface 30C side is greater than the thickness of the cover glass 30 on the side surface 30D side.

The light made incident on the display panel PNL by the switching element SW, the pixel electrode PE, the alignment films AL1 and AL2, the common electrode CE, and the like, which are arranged between the transparent substrate 10 and the transparent substrate 20, is attenuated due to undesired absorption and scattering by these various elements while traveling to the area separated from the light source LS.

The undesired absorption and scattering can be a factor for the decrease in luminance in the area separated from the light source LS. For this reason, a difference in luminance is caused between the area close to the light source LS and the area separated from the light source LS.

By increasing the thickness of the display device DSP, the number of light reflections in the display device DSP decreases. Therefore, the light can hardly be attenuated by reducing undesired absorption and scattering at various elements arranged on the array substrate AR and the counter-substrate CT, and the light can be made to travel to the area separated from the light source LS. As a result, the difference in luminance between the area close to the light source LS and the area separated from the light source LS is reduced.

In contrast, the luminance becomes smaller if the thickness of the display device DSP is increased, and the luminance becomes larger if the thickness of the display device DSP is decreased. In the cover glass 30, since the thickness of the display device DSP on the side surface 30C side is greater than the thickness on the side surface 30D side, the thickness of the display device DSP on the side surface 30C side is larger and that on the side surface 30D side is smaller.

Therefore, since the luminance of the display device DSP on the side surface 30D side becomes larger, the difference in luminance between the area close to the light source LS and the area separated from the light source LS is more reduced as compared with a case where the thickness of the cover glass 30 is constant, and the luminance can be made uniform. As a result, in the present embodiment, the degradation in display quality of the display device DSP can be suppressed by the cover glass 30.

In the present embodiment, the main surface 30B is an inclined slope which is inclined to the main surface 30A. The thickness of the cover glass 30 decreases at a constant rate as the distance from the light source LS increases along the first direction X. The thickness of the display device DSP can be thereby decreased at a constant rate as the distance from the light source LS increases.

In the present embodiment, the display device DSP further comprises the cover glass 40. The thickness of the display device DSP is further increased by comprising the cover glass 40 as compared to a case of not comprising the cover glass 40. For this reason, in the display device DSP, the difference in luminance between the area close to the light source LS and the area separated from the light source LS can be more reduced by the cover glass 40.

Furthermore, by making the light which is transmitted through the transparent substrate 10 reflected at the interface between the cover glass 40 and the air layer to travel inside the cover glass 40, the light can be made to travel to the area separated from the light source LS. As a result, the decrease in luminance in the area separated from the light source LS can be further suppressed by the cover glass 40.

In the cover glass 40, the thickness on the side surface 40C side is different from the thickness on the side surface 40D side. In the present embodiment, the thickness of the cover glass 40 on the side surface 40C side is greater than the thickness of the cover glass 40 on the side surface 40D side. The main surface 40A is an inclined surface that is inclined to the main surface 40B.

Therefore, the luminance of the display device DSP in the area separated from the light source LS can be improved, and the difference in luminance between the area close to the light source LS and the area separated from the light source LS can be further reduced.

Second Embodiment

A second embodiment will be described. The same constituent elements as those of the first embodiment are denoted by the same reference symbols, and their description is omitted as appropriate.

Figure 5:
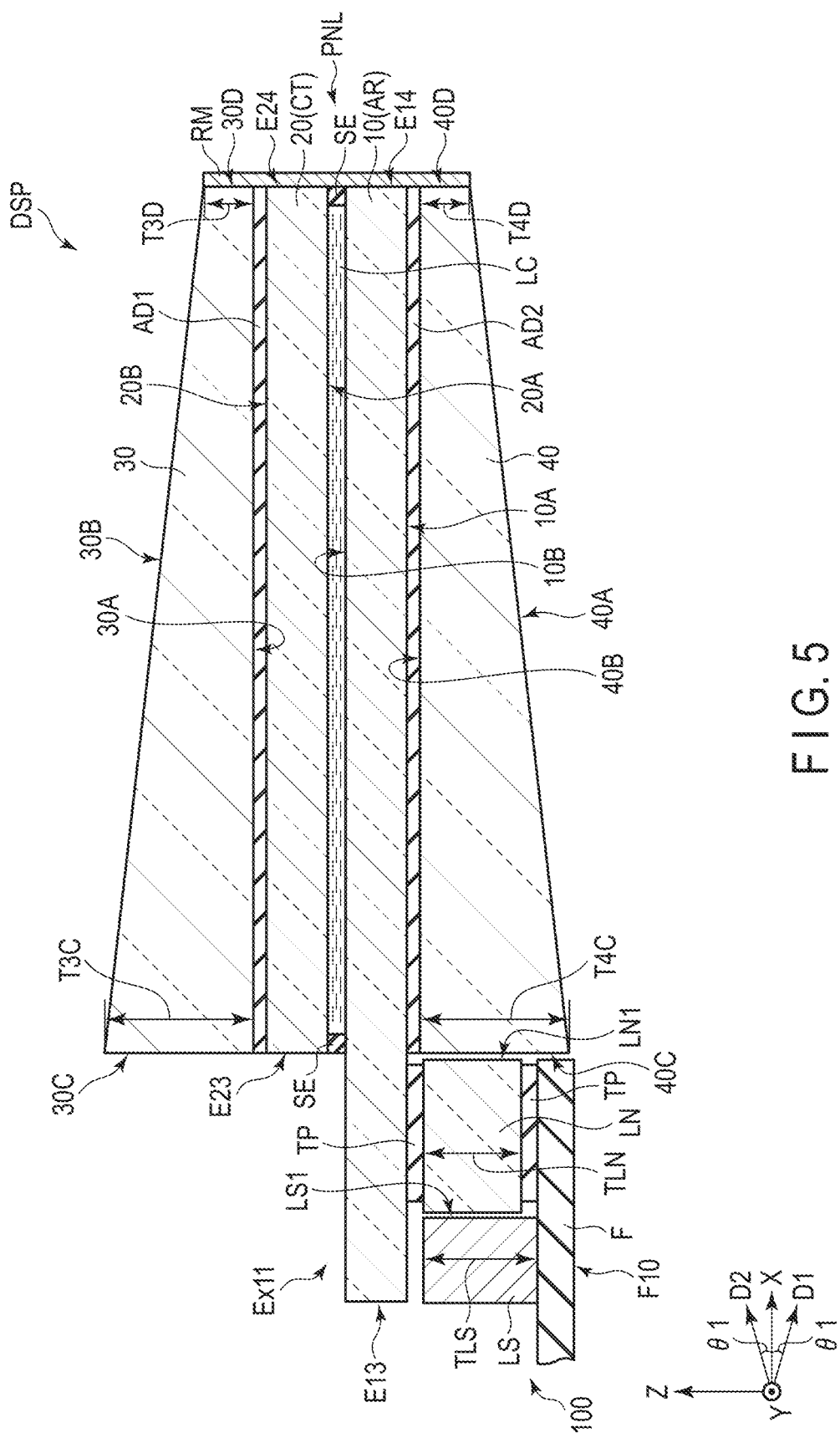
FIG. 5 is a cross-sectional view schematically showing a display device according to a second embodiment.

FIG. 5 is a cross-sectional view schematically showing a display device DSP according to the present embodiment. A configuration of the display panel PNL is the same as that of the above-described first embodiment. The display device DSP of the present embodiment is different from the first embodiment in a position where a light source unit 100 is installed.

The light source unit 100 is provided below the display panel PNL. A wiring board F, a light source LS, and a transparent substrate 10 are arranged in this order along the second direction Y. An end of the wiring board F is opposed to a side surface 40C.

A lens LN is located between a cover glass 40 and the light source LS. A side surface LN1 of the lens LN is opposed to the side surface 40C. The lens LN is bonded to the wiring board F by an adhesive material TP, and bonded to a main surface 10A on an extending portion Ex11 by the adhesive material TP.

The light source LS is opposed to the side surface 40C of the cover glass 40 with the lens LN interposed therebetween, in the first direction X. The light source LS emits light toward the side surface 40C. The thickness of the cover glass 40 on the side surface 40C side is greater than the thickness of the cover glass 40 on a side surface 40D side.

A thickness T4C of the cover glass 40 on the side surface 40C is greater than, for example, a thickness TLS of the light source LS and a thickness TLN of the lens LN. An entire surface of an emission surface LS1 of the light source LS is opposed to the side surface 40C with the lens LN interposed therebetween.

The same advantages as those of the first embodiment can also be obtained from the configuration of the present embodiment.

Third Embodiment

A third embodiment will be described. The same constituent elements as those of each of the embodiments are denoted by the same reference symbols, and their description is omitted as appropriate.

Figure 6:
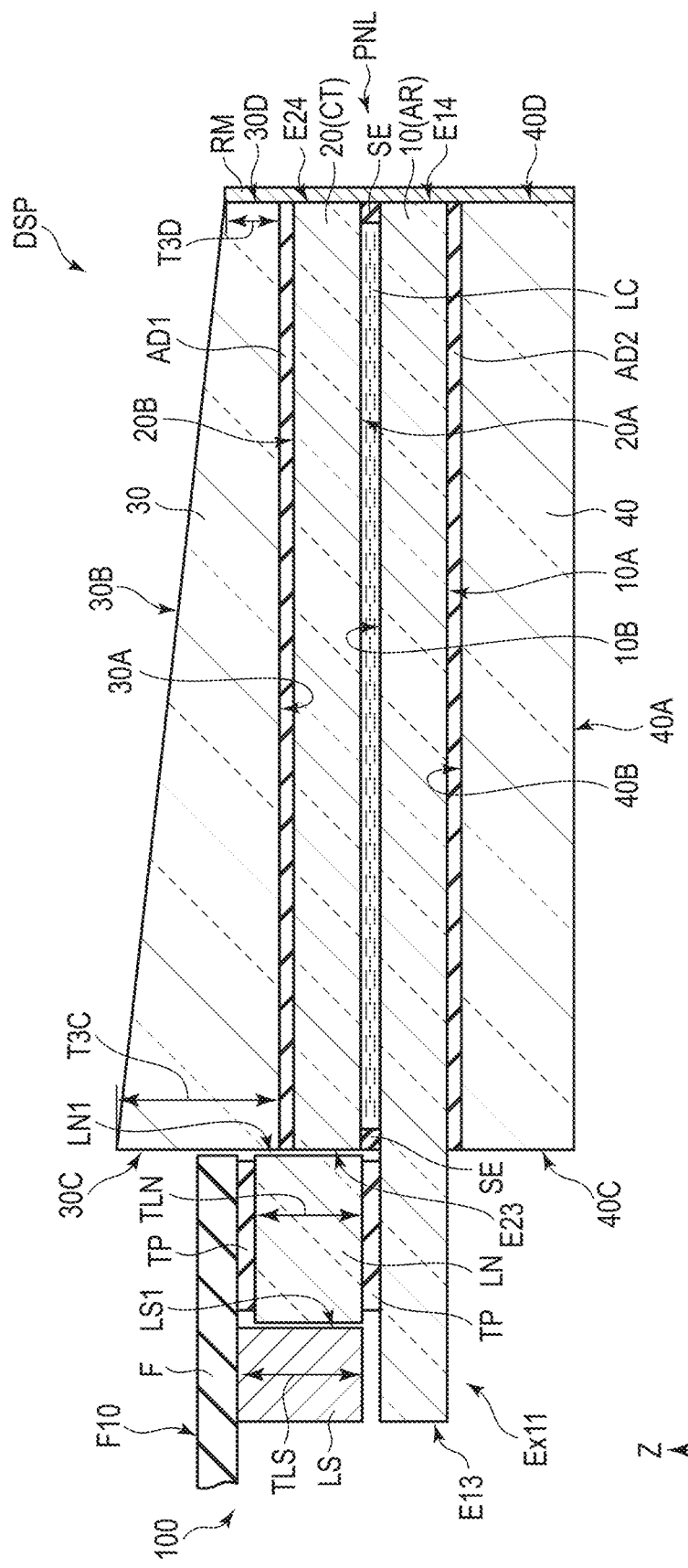
FIG. 6 is a cross-sectional view schematically showing a display device according to a third embodiment.

FIG. 6 is a cross-sectional view schematically showing the display device DSP according to the present embodiment. The display device DSP of the present embodiment is different from the first embodiment in a shape of a cover glass 40.

The cover glass 40 is formed in a flat plate shape substantially parallel to the X-Y plane. In the cover glass 40, a main surface 40A is substantially parallel to a main surface 40B. The thickness of the cover glass 40 is substantially constant.

In this case, being substantially constant means being constant in a design concept and indicates including variation in angle caused by a manufacturing process since implementing an ideal constant state in the manufacturing is difficult.

In the configuration of the present embodiment as well, since the display device DSP comprises the cover glass 30, the thickness of the display device DSP decreases at a constant rate as the distance from the light source LS increases along the first direction X. In other words, the thickness of the display device DSP in the area close to the light source LS is greater than the thickness of the display device DSP in the area separated from the light source LS. The same advantages as those obtained in the above-described first embodiment can be therefore obtained in the display device DSP according to the present embodiment.

Fourth Embodiment

A fourth embodiment will be described. The same constituent elements as those of each of the embodiments are denoted by the same reference symbols, and their description is omitted as appropriate.

Figure 7:
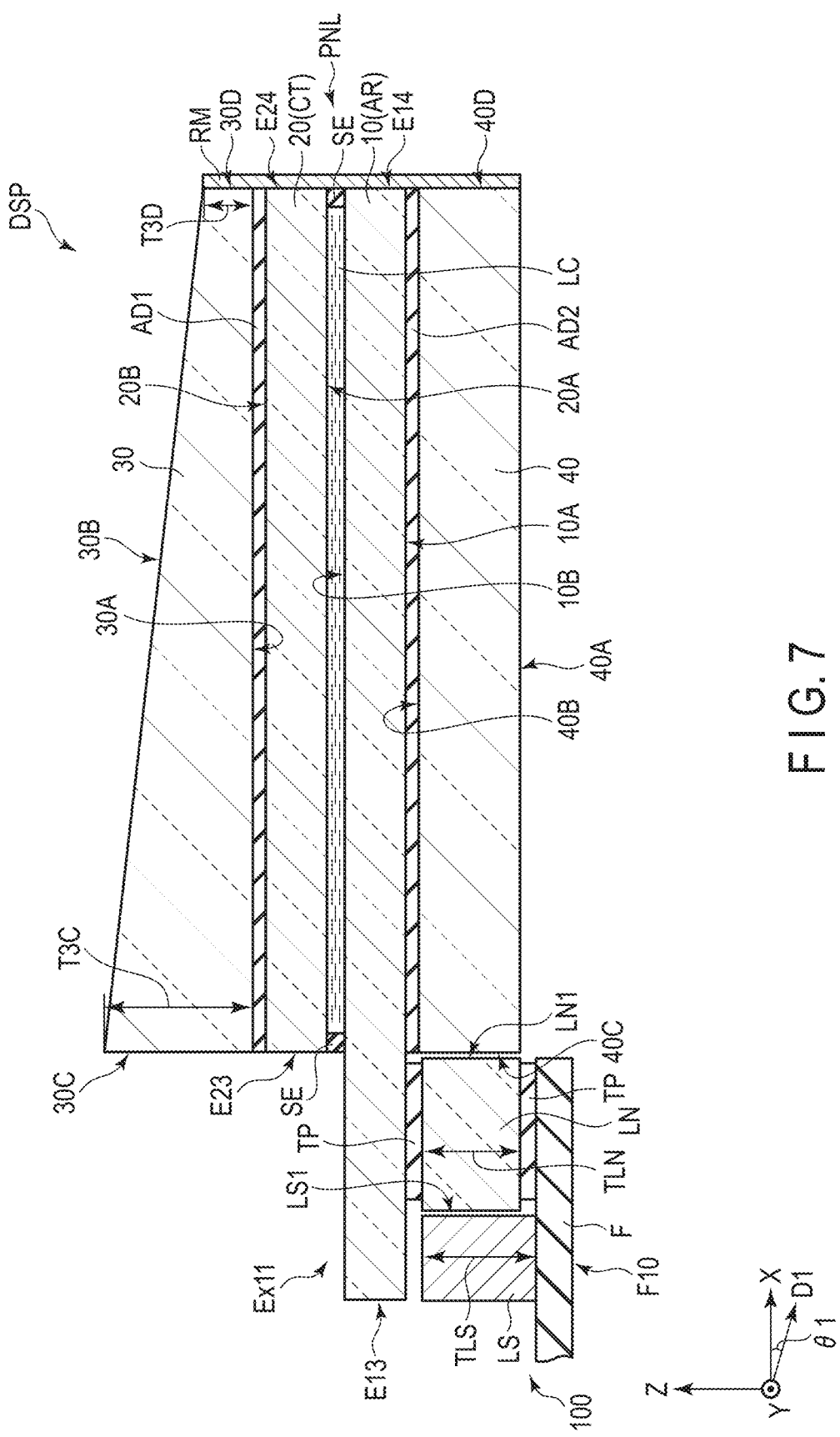
FIG. 7 is a cross-sectional view schematically showing a display device according to a fourth embodiment.

FIG. 7 is a cross-sectional view schematically showing a display device DSP according to the present embodiment. The display device DSP of the present embodiment is different from the second embodiment in a shape of a cover glass 40.

The cover glass 40 of the present embodiment has the same shape as the cover glass 40 of the third embodiment. In other words, the thickness of the cover glass 40 is substantially constant. The same advantages as those of the above-described first embodiment can also be obtained from the configuration of the present embodiment.

Fifth Embodiment

A fifth embodiment will be described. The same constituent elements as those of each of the embodiments are denoted by the same reference symbols, and their description is omitted as appropriate.

FIG. 8 is an exploded perspective view showing main portions of a display device DSP according to the present embodiment. The display device DSP of the present embodiment is different from the first embodiment in comprising a low-refractive layer 60 and a support member SA.

The display device DSP further comprises the low-refractive layer 60. The low-refractive layer 60 is formed on a main surface 30A. A refractive index of the low-refractive layer 60 is smaller than a refractive index of a transparent substrate 30. The low-refractive layer 60 is formed of, for example, an organic material such as siloxane-based resin, which is transparent.

The low-refractive layer 60 includes a base 61, a plurality of band portions 62, and a plurality of apertures 63 formed between the plurality of band portions 62. The low-refractive layer 60 is in contact with the main surface 30A at the plurality of band portions 62. The main surface 30A is exposed in the plurality of apertures 63.

The light source unit 100 further includes a support member SA. The support member SA is located between an extending portion Ex11 and a lens LN in the third direction Z. The support member SA is a rod-shaped member extending in the second direction Y.

The support member SA is formed of acrylic resin, glass, or the like, as an example, but is not limited to this example. The support member SA is desirably formed of an opaque and untransparent material. Incidentally, the support member SA may be a single member or may be composed of a plurality of members.

Figure 9:
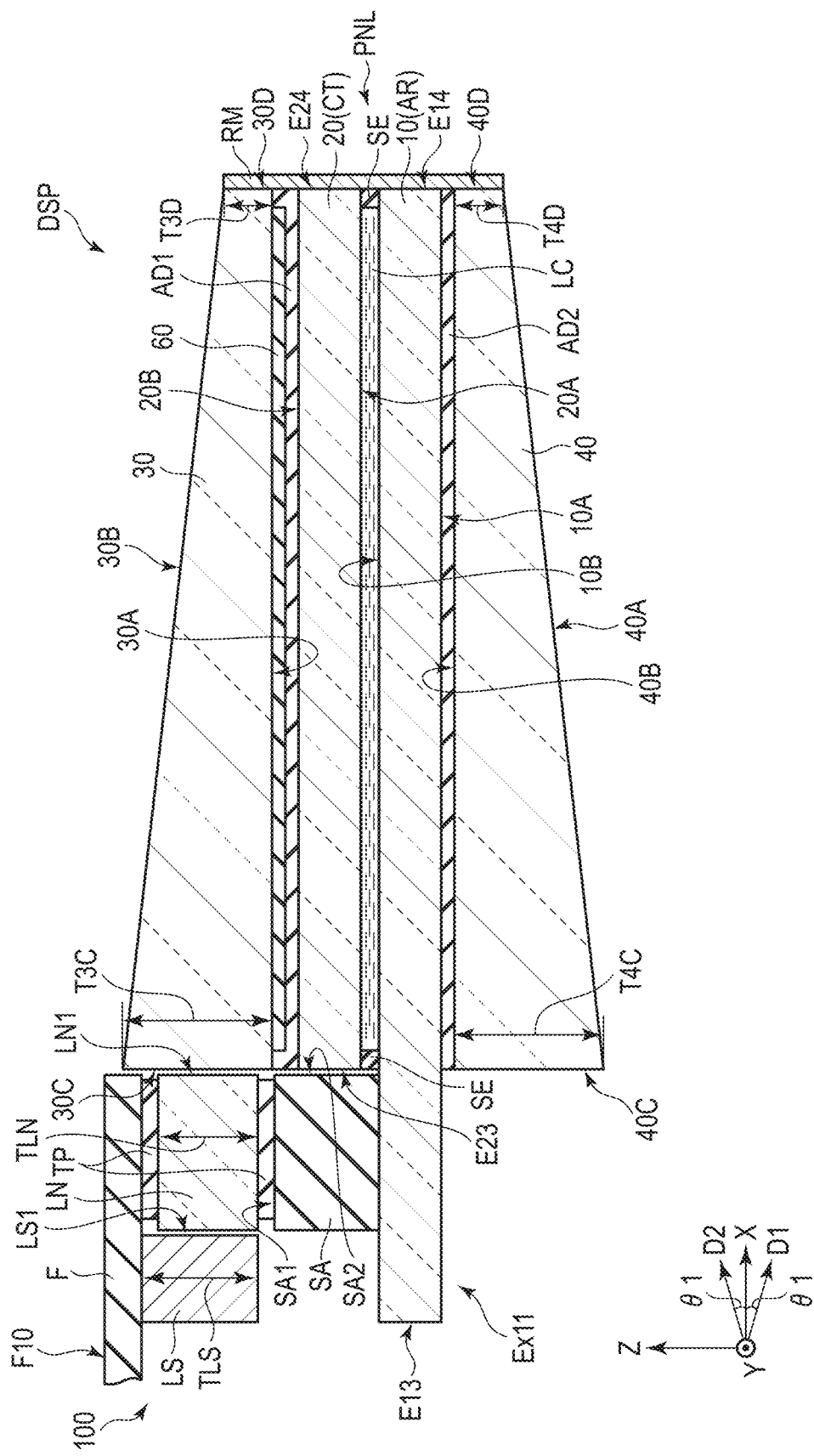
FIG. 9 is a cross-sectional view schematically showing the display device according to the fifth embodiment.

FIG. 9 is a cross-sectional view schematically showing the display device DSP according to the present embodiment. An adhesive layer AD1 bonds the cover glass 30 to the display panel PNL with the low-refractive layer 60 interposed therebetween. From another viewpoint, the adhesive layer AD1 is in contact with the main surface 20B of the transparent substrate 20, and the low-refractive layer 60.

The adhesive layer AD1 is in contact with the main surface 30A of the cover glass 30 in an area which overlaps with the plurality of apertures 63 in the low-refractive layer 60. A refractive index of the adhesive layer AD1 is equal to a refractive index of the transparent substrate 10 and the cover glass 30 and greater than a refractive index of the low-refractive layer 60.

A difference between the refractive index of the cover glass 30 and the refractive index of the low-refractive layer 60 is, for example, approximately 0.1. In one example, the refractive index of the cover glass 30 is 1.5, the refractive index of the low-refractive layer 60 is 1.41, and the refractive index of the adhesive layer AD1 is 1.474.

The transparent substrate 10, the support member SA, the lens LN, and a wiring board F are aligned in this order along the third direction Z. The size of the support member SA is substantially equal to the size of the lens LN in plan view. In the example shown in FIG. 9, the cross-section of the support member SA is a rectangular shape.

The support member SA has an upper surface SA1 and a side surface SA2. The upper surface SA1 is opposed to the lens LN. The side surface SA2 is opposed to a side surface E23 of the transparent substrate 20. A reflective material capable of reflecting light may be provided on the upper surface SA1. Light from the lens LN can hardly reach the side surface E23 through the support member SA, by providing the reflective material on the upper surface SA1.

The upper surface SA1 of the support member SA is located above the main surface 20B of the transparent substrate 20 in the third direction Z. The upper surface SA1 of the support member SA may be located on the same plane as the main surface 20B of the transparent substrate 20.

The lens LN is bonded to the wiring board F by an adhesive material TP and bonded to the support member SA by the adhesive material TP. The support member SA is bonded to the main surface 10B by an adhesive material (not shown). These adhesive materials TP are, for example, double-sided tapes.

The light source LS, the lens LN, and the cover glass 30 are aligned in this order along the first direction X. The light source LS and the lens LN are located above the support member SA and also located above the low-refractive layer 60. From another viewpoint, the low-refractive layer 60 is located between the light source LS and the display panel PNL, in the third direction Z.

A thickness T3C of the cover glass 30 on the side surface 30C is greater than, for example, a thickness TLS of the light source LS and a thickness TLN of the lens LN. An entire surface of an emission surface LS1 of the light source LS is opposed to the side surface 30C of the cover glass 30 with the lens LN interposed therebetween.

In contrast, the light source LS and the lens LN are not opposed to the side surface E23. For this reason, the light emitted from the light source LS is made incident on the cover glass 30 from the side surface 30C, but hardly made incident on the transparent substrate 20 from the side surface E23.

Next, the shape of the low-refractive layer 60 will be described.

Figure 10:
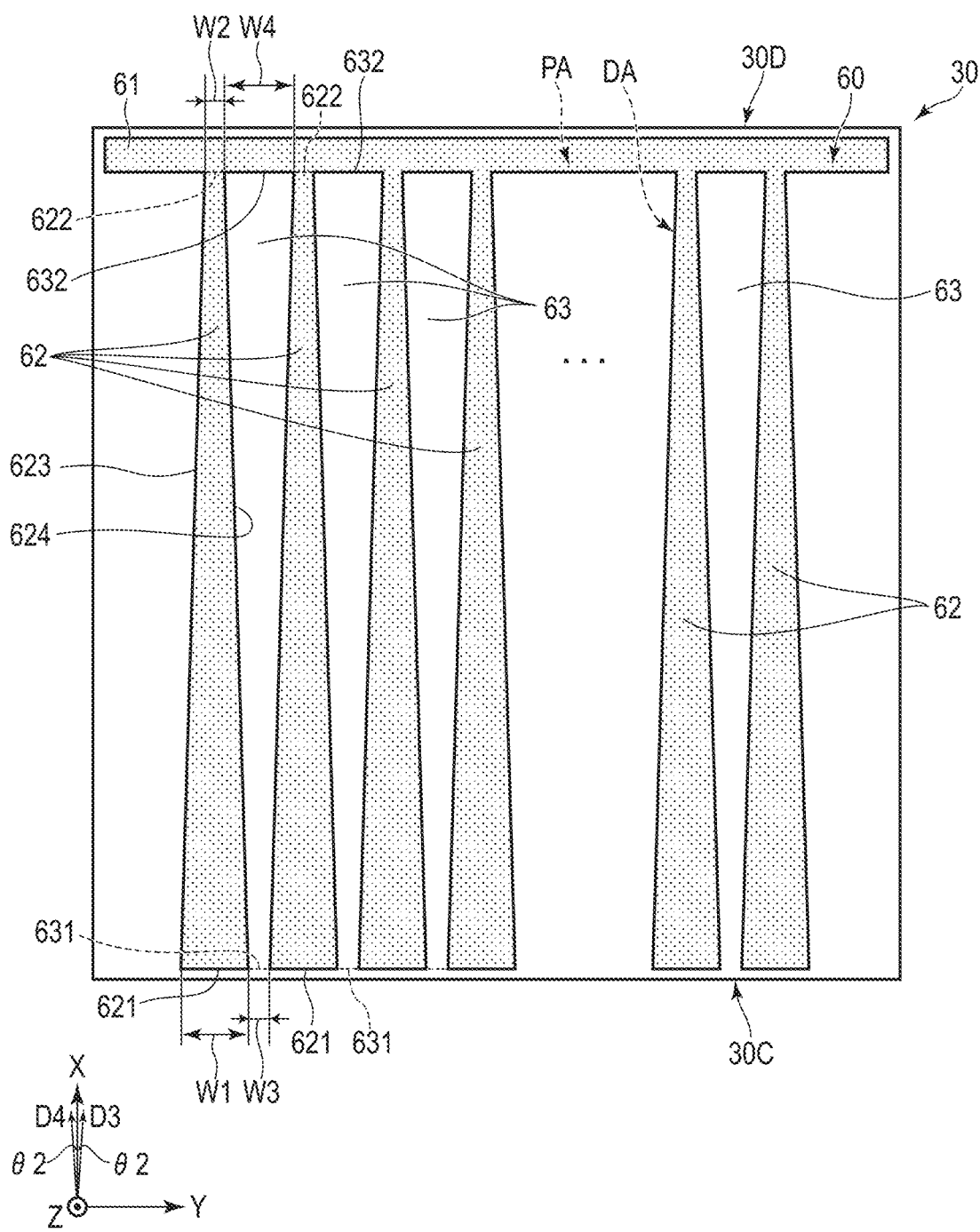
FIG. 10 is a plan view showing a configuration example of a low-refractive layer shown in FIG. 8.

FIG. 10 is a plan view showing a configuration example of the low-refractive layer 60 shown in FIG. 8. As described with reference to FIG. 8, the low-refractive layer 60 includes the base 61, the plurality of band portions 62 connected to the base 61, and the plurality of apertures 63 formed between the plurality of band portions 62. For example, the base 61 and the plurality of band portions 62 are formed integrally.

The base 61 is located on a side surface 30D side on the main surface 30A. The base 61 has a substantially rectangular shape extending in the second direction Y. The base 61 has a pair of short sides along the first direction X and a pair of long sides along the second direction Y, in plan view.

The plurality of band portions 62 extend in the first direction X and are spaced apart in the second direction Y. The band portion 62 includes a first end portion 621 on the side surface 30C side, a second end portion 622 on a side opposite to the first end portion 621, a first edge 623, and a second edge 624.

The second end portions 622 correspond to portions of the plurality of band portions 62, on the side surface 30D side. The plurality of band portions 62 are connected to the long side of the base 61, on the side surface 30C side, at the second end portions 622. A length of the first end portion 621 along the second direction Y is referred to as a first width W1, and a length of the second end portion 622 along the second direction Y is referred to as a second width W2. In the example shown in FIG. 10, the first width W1 is greater than the second width W2 (W1>W2).

The first edge 623 and the second edge 624 extend in a direction different from the first direction X and the second direction Y, at positions between the first end portion 621 and the second end portion 622. In plan view, for example, a direction intersecting the first direction X clockwise at an acute angle is defined as a direction D3, and a direction intersecting the first direction X counterclockwise at an acute angle is defined as a direction D4.

Incidentally, for example, the angle θ2 formed between the first direction X and the direction D3 and the angle θ2 formed between the first direction X and the direction D4 are equal to each other, but are not limited to this example, and the angle formed between the first direction X and the direction D3 may be different from the angle formed between the first direction X and the direction D4.

The first edge 623 extends along the direction D3, and the second edge 624 extends along the direction D4. In the example shown in FIG. 10, both the first edge 623 and the second edge 624 extend linearly, but may be formed in a curved shape. Thus, the band portion 62 has a width which decreases at a constant rate or an arbitrary rate from the first end portion 621 to the second end portion 622 along the first direction X.

The aperture 63 is located between two adjacent band portions 62. The aperture 63 includes a third end portion 631 between the first end portion 621 of one band portion 62 and the first end portion 621 of the other band portion 62, and a fourth end portion 632 between the second end portion 622 of one band portion 62 and the second end portion 622 of the other band portion 62. The fourth end portion 632 is, for example, a portion which is in contact with the long side of the base 61 on the side surface 30C side.

A length of the third end portion 631 along the second direction Y is referred to as a third width W3, and a length of the fourth end portion 632 along the second direction Y is referred to as a fourth width W4. The third width W3 corresponds to an interval between the first end portion 621 of one band portion 62 and the first end portion 621 of the other band portion 62. The fourth width W4 corresponds to an interval between the second end portion 622 of one band portion 62 and the second end portion 622 of the other band portion 62.

The third width W3 is smaller than the fourth width W4 (W3<W4). The aperture 63 has a width which increases at a constant rate or an arbitrary rate from the third end portion 631 to the fourth end portion 632 along the first direction X.

In the example shown in FIG. 10, for example, the low-refractive layer 60 is located inside the outer shape of the cover glass 30. When the display panel PNL and the cover glass 30 overlap, the plurality of band portions 62 overlap with the display area DA, and the base 61 overlaps with the surrounding area PA, in plan view. In the display area DA, the first edges 623 and the second edges 624 which are inclined to the first direction X and the second direction Y, of the plurality of band portions 62, overlap with the display area DA.

By constituting the low-refractive layer 60 as described above, the area where the cover glass 30 and the plurality of band portions 62 overlap is larger in the area closer to the light sources LS and smaller in the area farther from the light sources LS.

The area where the cover glass 30 and the plurality of band portions 62 overlap corresponds to an area where the light made incident on the cover glass 30 is hardly made incident on the display panel PNL side. The area where the cover glass 30 and the plurality of apertures 63 overlap corresponds to an area where the light made incident on the cover glass 30 can be made incident on the display panel PNL side.

Figure 11:
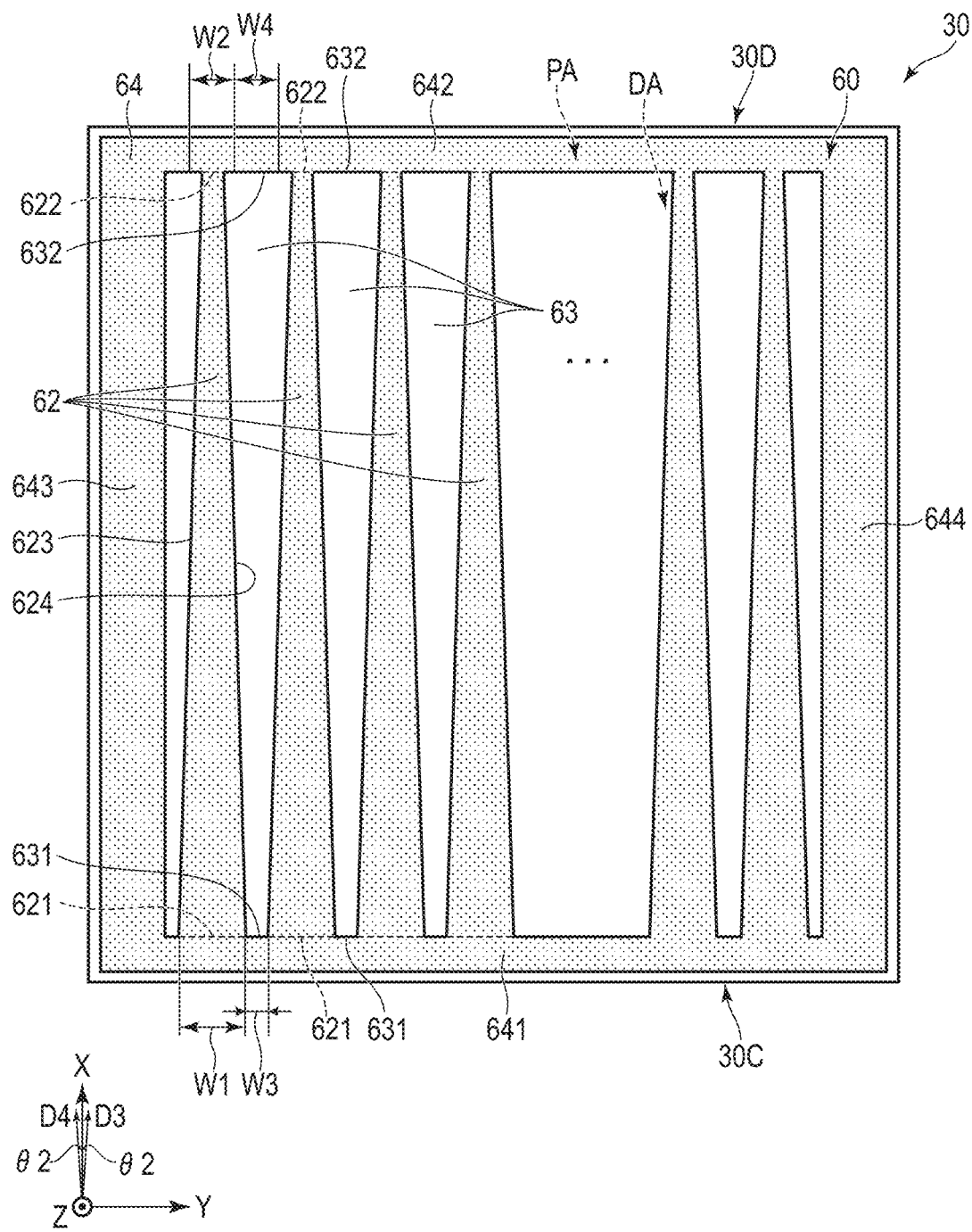
FIG. 11 is a plan view showing another configuration example of the low-refractive layer.

FIG. 11 is a plan view showing another configuration example of the low-refractive layer 60. In the example shown in FIG. 11, the low-refractive layer 60 includes the plurality of band portions 62, a frame portion 64 surrounding the plurality of band portions 62, and the apertures 63. For example, the plurality of band portions 62 and the frame portion 64 are formed integrally.

The apertures 63 are formed between the plurality of band portions 62, and between the band portions 62 and the frame portion 64. The low-refractive layer 60 shown in FIG. 11 is different from the low-refractive layer 60 described with reference to FIG. 10 in including the frame portion 64 instead of the base portion 61.

For example, the outer shape of the frame portion 64 is located inside the outer shape of the cover glass 30. The frame portion 64 overlaps with the surrounding area PA, and the inner side of the frame portion 64 corresponds to the display area DA. The frame portion 64 includes a first portion 641 and a second portion 642 which extend along the second direction Y, and a third portion 643 and a fourth portion 644 which extend along the first direction X.

The first portion 641 is located between the side surface 30C and the display area DA, and the second portion 642 is located between the side surface 30D and the display area DA, in the first direction X. The first end portions 621 of the plurality of band portions 62 are connected to the first portion 641, and the second end portions 622 of the plurality of band portions 62 are connected to the second portion 642.

The shape of the low-refractive layer 60 is not limited to the examples shown in FIG. 10 and FIG. 11, but may be other shapes. For example, the amount of light made incident on the display panel PNL side, and the like can be adjusted by changing the shape of the band portions 62 or changing the size of the band portions 62.

Next, the light emitted from the light source LS will be described with reference to FIG. 9.

The light emitted from the light source LS is moderately diffused on the lens LN and is made incident on the cover glass 30 from the side surface 30C. For example, the light traveling toward the main surface 30B, of the light made incident on the cover glass 30, is reflected at an interface between the cover glass 30 and the air layer.

As described above, the refractive index of the low-refractive layer 60 is lower than that of the cover glass 30. For this reason, light traveling from the cover glass 30 toward the plurality of band portions 62 of the low-refractive layer 60, of the light made incident on the cover glass 30, is reflected at the interface between the cover glass 30 and the plurality of band portions 62.

The light travels inside the cover glass 30 while being repeatedly reflected, in the area where the cover glass 30 and the plurality of band portions 62 of the low-refractive layer 60 overlap. Of the light, the light traveling toward the area where the cover glass 30 and the plurality of apertures 63 of the low-refractive layer 60 overlap is transmitted through the cover glass 30 and is made incident on the display panel PNL through the adhesive layer AD1. The light made incident on the display panel PNL is transmitted through the transparent substrate 20, the liquid crystal layer LC, and the transparent substrate 10 in this order.

The area where the main surface 30A and the plurality of band portions 62 overlap is larger in the area closer to the light source LS and smaller in the area farther from the light source LS. For this reason, the incidence of the light from the light sources LS on the display panel PNL is suppressed in the area close to the light sources LS.

In contrast, the incidence of the light on the display panel PNL is promoted in the area separated from the light sources LS. Incidentally, in the area close to the light source LS, the light is not definitely made incident on the display panel PNL, but the light from the aperture 63 is made incident on the display panel PNL.

The same advantages as those of the above-described first embodiment can also be obtained from the configuration of the present embodiment. The display device DSP of the present embodiment comprises a low-refraction layer 60. As regards the light made incident on the cover glass 30 from the side surface 30C, the incidence of the light from the light source LS on the display panel PNL in the area close to the light source LS is suppressed, and the incidence of the light on the display panel PNL in the area separated from the light source LS is promoted.

The light made incident on the cover glass 30 can be thereby made to travel to the area separated from the light source LS without attenuation. As a result, as compared to the first embodiment, the display device DSP of the present embodiment can suppress the decrease in luminance in the area separated from the light source LS and can further reduce the difference in luminance between the area close to the light source LS and the area separated from the light source LS.

Furthermore, the light source LS is located above the low-refractive layer 60. From another viewpoint, the light source LS is opposed to the side surface 30C across the lens LN and is not opposed to the side surface E23.

Most of the light emitted from the light source LS can be thereby made incident on the cover glass 30 from the side surface 30C. As a result, the light emitted from the light source LS can be made to travel to an area separated from the light source LS by the low-refractive layer 60. In the present embodiment, the degradation in display quality of the display device DSP can be further suppressed.

Sixth Embodiment

A sixth embodiment will be described. The same constituent elements as those of each of the embodiments are denoted by the same reference symbols, and their description is omitted as appropriate.

Figure 12:
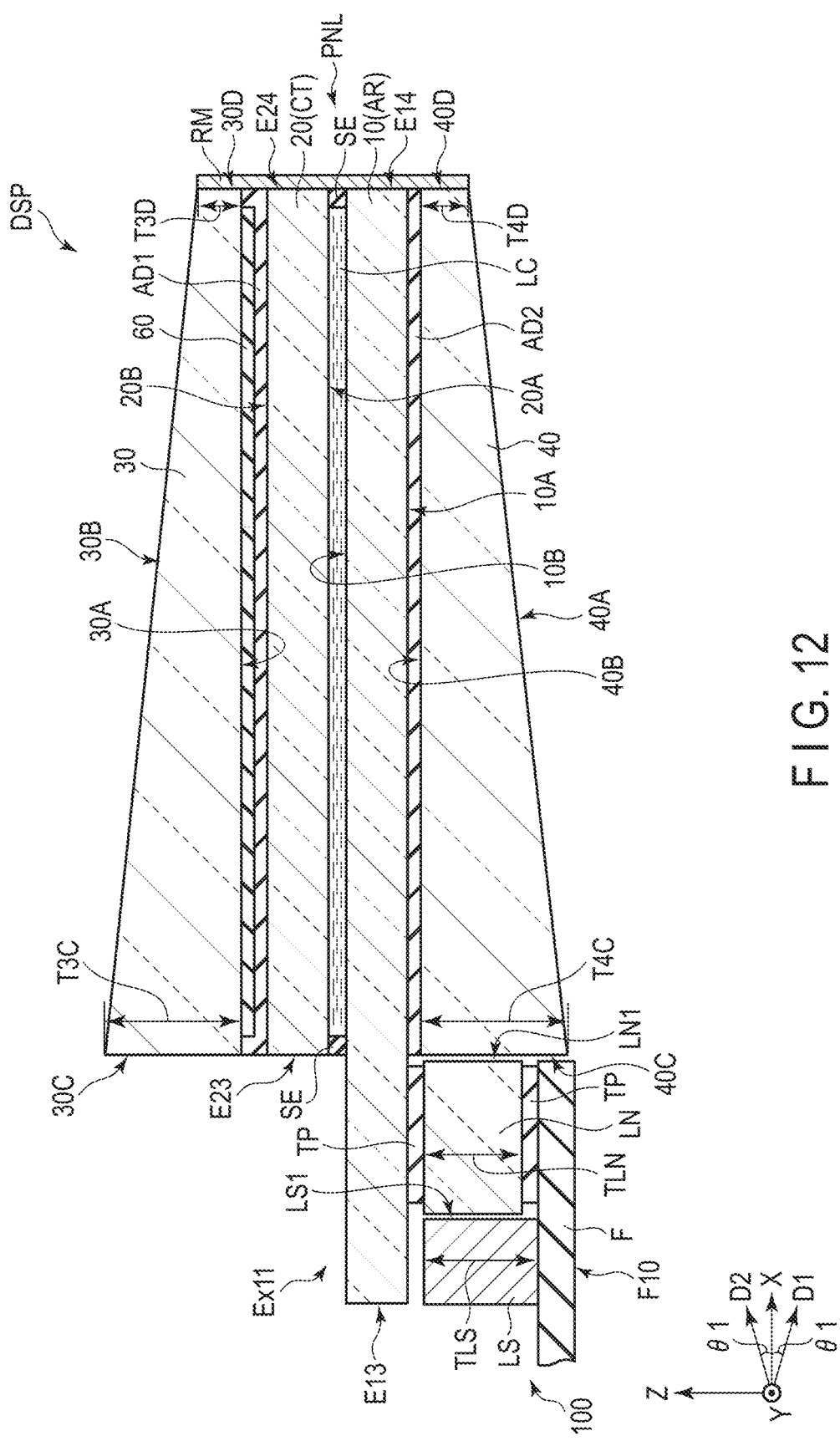
FIG. 12 is a cross-sectional view schematically showing a display device according to a sixth embodiment.

FIG. 12 is a cross-sectional view schematically showing a display device DSP according to the present embodiment. The display device DSP of the present embodiment is different from the fifth embodiment in a position where a light source unit 100 is provided.

The light source unit 100 is provided below the display panel PNL. A wiring board F, a light source LS, and a transparent substrate 10 are arranged in this order along the third direction Z. An end of the wiring board F is opposed to a side surface 40C.

A lens LN is located between a cover glass 40 and the light source LS. A side surface LN1 of the lens LN is opposed to the side surface 40C. The lens LN is bonded to the wiring board F by an adhesive material TP, and bonded to a main surface 10A on an extending portion Ex11 by the adhesive material TP. The light source LS is opposed to the side surface 40C of the cover glass 40 with the lens LN interposed therebetween, in the first direction X. The light source LS emits light toward the side surface 40C.

A thickness T4C of the cover glass 40 on the side surface 40C is greater than, for example, a thickness TLS of the light source LS and a thickness TLN of the lens LN. An entire surface of an emission surface LS1 of the light source LS is opposed to the side surface 40C with the lens LN interposed therebetween.

The display device DSP comprises a low-refractive layer 60. The low-refractive layer 60 has the shape described with reference to FIG. 10 or the shape described with reference to FIG. 11. The area where the main surface 30A and the plurality of band portions 62 overlap is larger in the area closer to the light source LS and smaller in the area farther from the light source LS. For this reason, the incidence of the light from the display panel PNL to the cover glass 30 is suppressed in the area close to the light source LS.

In the area close to the light source LS, the light traveling toward the display panel PNL, of the light made incident on the side surface 40C, is transmitted through the transparent substrate 10, the liquid crystal layer LC, and the transparent substrate 20, in this order. For example, the light traveling toward the area where the cover glass 30 and the plurality of apertures 63 overlap, of the light made incident on the transparent substrate 20, is made incident on the cover glass 30 through the adhesive layer AD1.

This light travels toward the main surface 30B, is reflected at the interface between the cover glass 30 and the air layer, and then travels toward the area where the plurality of band portions 62 of the low-refractive layer 60 overlap. The light traveling toward the area where the cover glass 30 overlaps with the plurality of band portions 62 of the low-refractive layer 60 is reflected at the interface between the cover glass 30 and the plurality of band portions 62 of the low-refractive layer 60 and proceeds toward the main surface 30B.

Thus, the light having passed through the apertures 63, of the light made incident on the side surface 40C, travels inside the cover glass 40 while being repeatedly reflected in the area close to the light source LS. Therefore, the light made incident on the cover glass 40 can be made to travel toward the area separated from the light source LS without being attenuated.

The light traveling toward the area where the cover glass 30 overlaps with the plurality of apertures 63 in the low-refractive layer 60, of the light traveling inside the cover glass 30, is transmitted through the cover glass 30 and is made incident on the display panel PNL through the adhesive layer AD1.

The same advantages as those of the above-described first embodiment can also be obtained from the configuration of the present embodiment. The display device DSP of the present embodiment comprises a low-refractive layer 60, similarly to the fifth embodiment. Therefore, the light made incident on the cover glass 40 can be made to travel toward the area separated from the light source LS without being attenuated.

As a result, in the display device DSP of the present embodiment, as compared with the second embodiment, the decrease in luminance in the area separated from the light source LS can be suppressed, and the difference in luminance between the area close to the light source LS and the area separated from the light source LS can be more reduced. In the present embodiment, the degradation in display quality of the display device DSP can be further suppressed.

Seventh Embodiment

A seventh embodiment will be described. The same constituent elements as those of each of the embodiments are denoted by the same reference symbols, and their description is omitted as appropriate.

Figure 13:
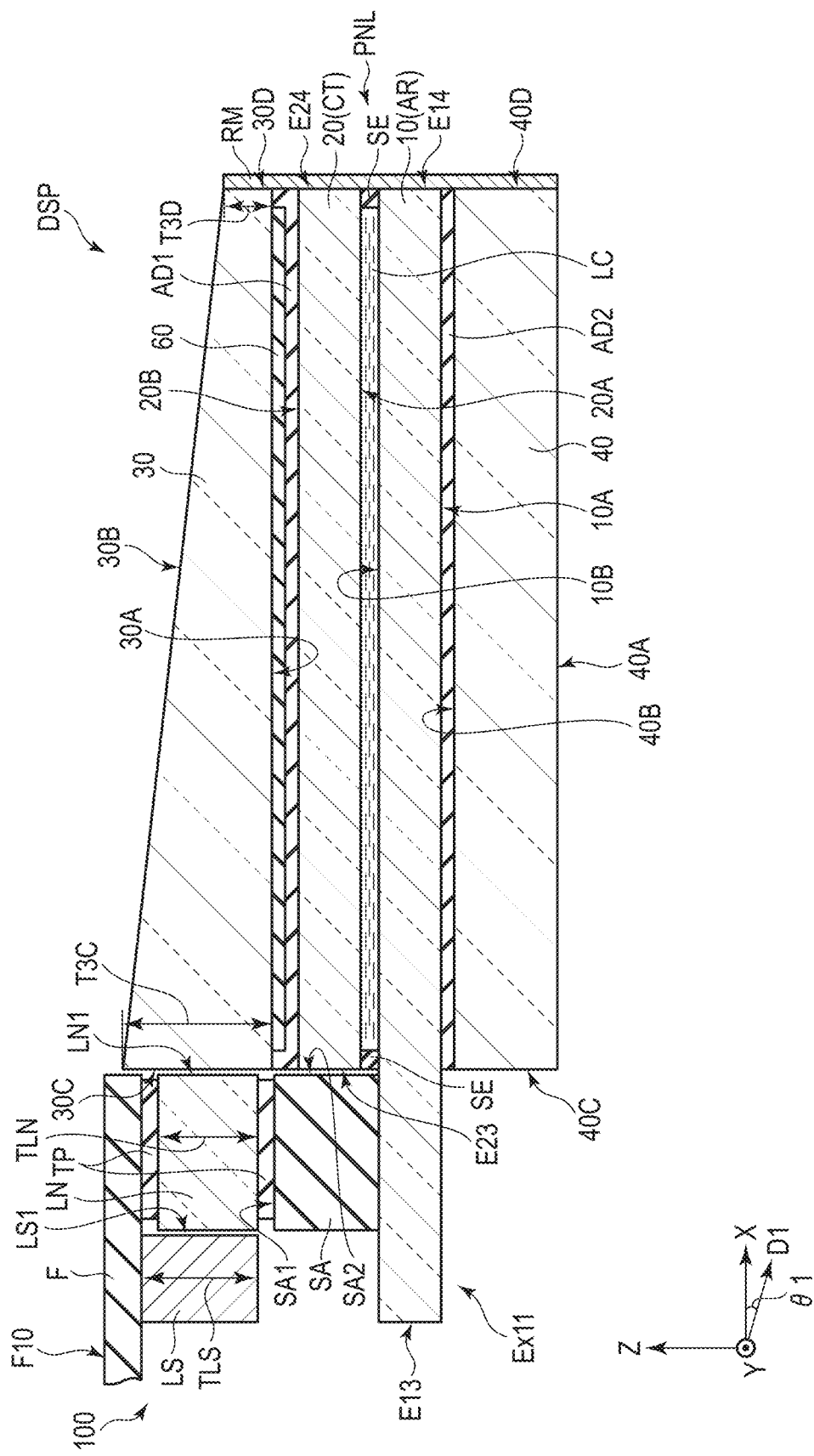
FIG. 13 is a cross-sectional view schematically showing a display device according to a seventh embodiment.

FIG. 13 is a cross-sectional view schematically showing a display device DSP according to the present embodiment. The display device DSP of the present embodiment is different from the fifth embodiment in a shape of a cover glass 40. The cover glass 40 of the present embodiment has the same shape as the cover glass 40 of the third embodiment. In other words, the thickness of the cover glass 40 is substantially constant.

The configuration of the present embodiment is a combination of the configuration of the third embodiment and the configuration of the fifth embodiment. The same advantages as those of the above-described fifth embodiment can also be obtained from the configuration of the present embodiment.

Eighth Embodiment

An eighth embodiment will be described. The same constituent elements as those of each of the embodiments are denoted by the same reference symbols, and their description is omitted as appropriate.

Figure 14:
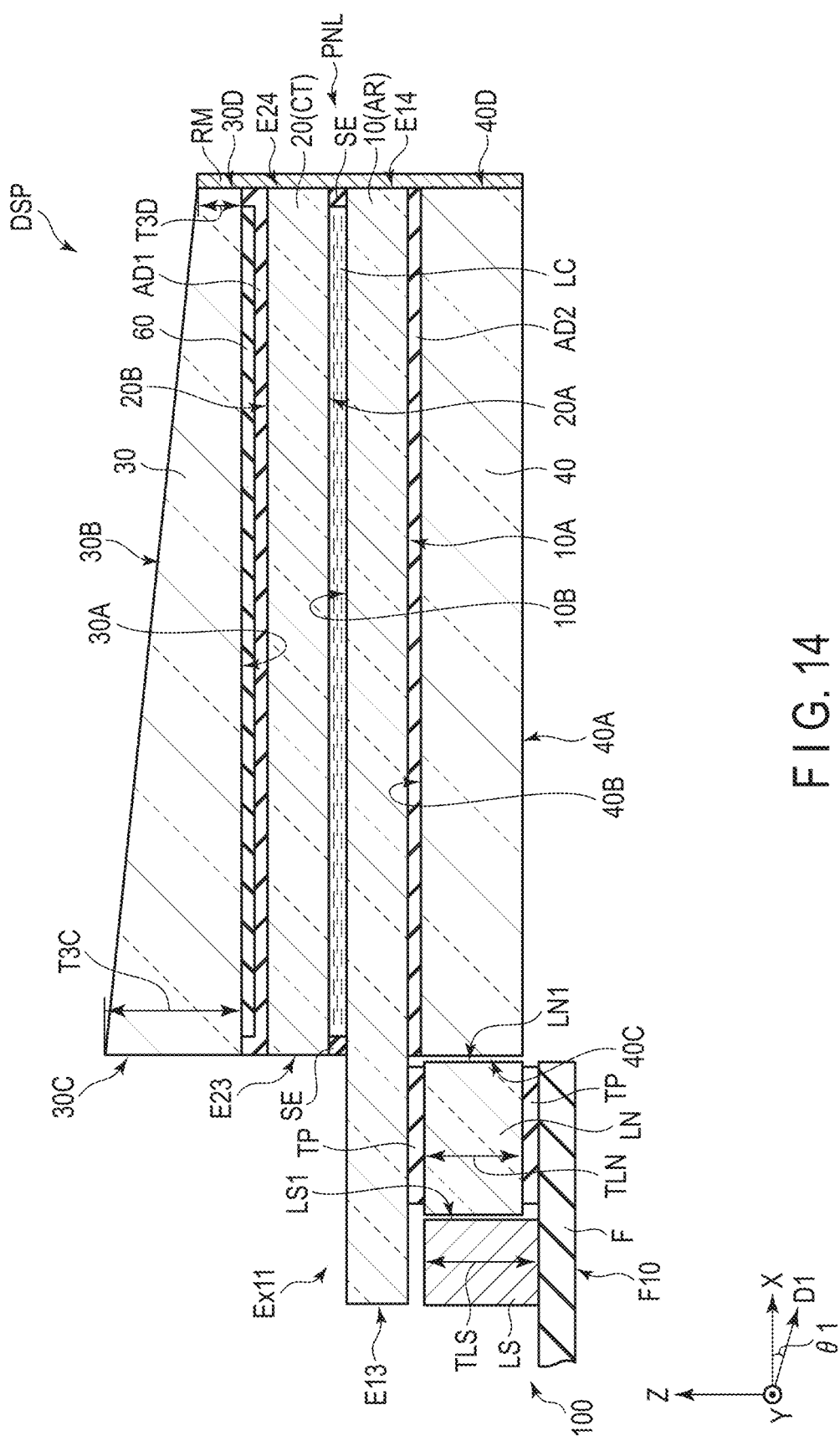
FIG. 14 is a cross-sectional view schematically showing a display device according to an eighth embodiment.

FIG. 14 is a cross-sectional view schematically showing a display device DSP according to the present embodiment. The display device DSP of the present embodiment is different from the sixth embodiment in a shape of a cover glass 40. The cover glass 40 of the present embodiment has the same shape as the cover glass 40 of the third embodiment. In other words, the thickness of the cover glass 40 is substantially constant.

The configuration of the present embodiment is a combination of the configuration of the third embodiment and the configuration of the sixth embodiment. The same advantages as those of the above-described sixth embodiment can also be obtained from the configuration of the present embodiment.

Ninth Embodiment

A ninth embodiment will be described. The same constituent elements as those of each of the embodiments are denoted by the same reference symbols, and their description is omitted as appropriate.

Figure 15:
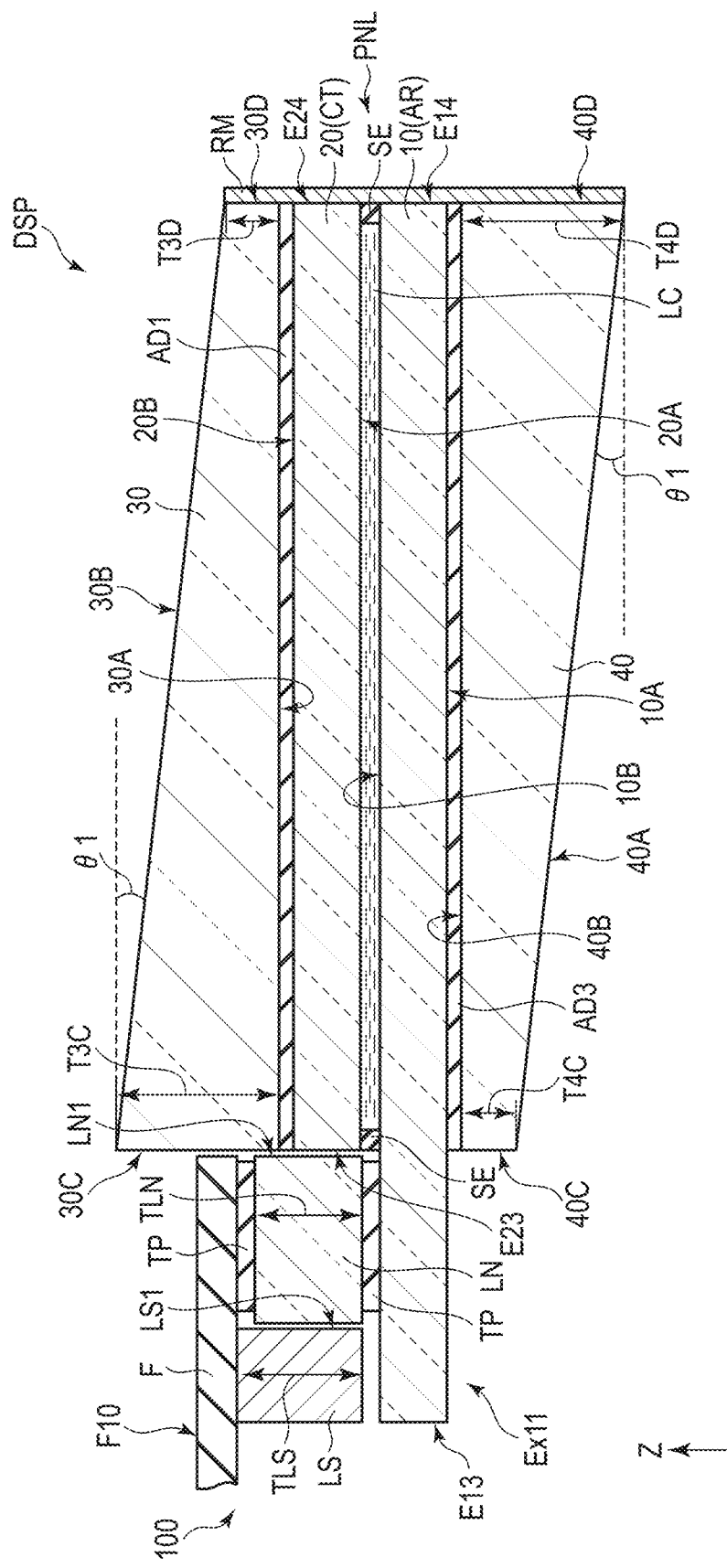
FIG. 15 is a cross-sectional view schematically showing a display device according to a ninth embodiment.

FIG. 15 is a cross-sectional view schematically showing a display device DSP according to the present embodiment. The display device DSP of the present embodiment is different from the first embodiment in the shape of the cover glass 40 and including an adhesive layer AD3.

In the cover glass 40, a main surface 40A is an inclined surface which is inclined to a main surface 40B. Similarly to a main surface 30B, the main surface 40A extends along the direction D1. The main surface 30B is substantially parallel to the main surface 40A.

The cover glass 40 has a thickness which increases at a constant rate as the distance from the light source LS increases along the first direction X. The main surface 40A is separated from the display panel PNL as the distance from the light source LS increases.

In other words, the thickness of the cover glass 40 on the side surface 40C side is different from the thickness of the cover glass 40 on the side surface 40D side. In the present embodiment, the thickness of the cover glass 40 on the side surface 40C side is smaller than the thickness of the cover glass 40 on the side surface 40D side. For example, a thickness T4C of the cover glass 40 on the side surface 40C is the smallest, and a thickness T4D of the cover glass 40 on the side surface 40D is the greatest.

In one example, the thickness T4D of the cover glass 40 on the side surface 40D is substantially equal to the thickness T3C of the cover glass 30 on the side surface 30C, and the thickness T4C of the cover glass 40 on the side surface 40C is substantially equal to the thickness T3D of the cover glass 30 on the side surface 30D. In the present embodiment, the thickness of the display device DSP in the area which overlaps with the cover glasses 30 and 40 hardly changes in the first direction X.

Since the display device DSP comprises the cover glass 30 described with reference to FIG. 4, the thickness including the cover glass 30 and the display panel PNL in the area close to the light source LS is different from the thickness including the cover glass 30 and the display panel PNL in the area separated from the light source LS.

In the present embodiment, the thickness including the cover glass 30 and the display panel PNL decreases at a constant rate as the distance from the light source LS increases along the first direction X. In other words, the thickness including the cover glass 30 and the display panel PNL in the area close to the light source LS is greater than the thickness including the cover glass 30 and the display panel PNL in the area separated from the light source LS.

The display device DSP comprises an adhesive layer AD3 that bonds the display panel PNL and the cover glass 40. The adhesive layer AD3 is in contact with the main surface 10A of the transparent substrate 10 and the main surface 40B of the cover glass 40.

The refractive index of the adhesive layer AD3 is different from the refractive index of the adhesive layer AD2 of the first embodiment. More specifically, the refractive index of the adhesive layer AD3 is smaller than the refractive index of the adhesive layer AD2 of the first embodiment. As compared to the refractive index of the transparent substrate 10, the refractive index of the adhesive layer AD3 is smaller than the refractive index of the transparent substrate 10.

The display device DSP of the present embodiment comprises the adhesive layer AD3 having the refractive index smaller than the refractive index of the transparent substrate 10. Furthermore, the main surface 30B is substantially parallel to the main surface 40A. In the present embodiment, the light made incident on the display panel PNL is transmitted through the transparent substrate 20, the liquid crystal layer LC, and the transparent substrate 10 in this order.

The light transmitted through the transparent substrate 10 is reflected at the interface between the transparent substrate 10 and the adhesive layer AD3. Since little light is made incident on the cover glass 40, the cover glass 40 hardly contributes to the travel of light in the display device DSP.

In the present embodiment, the thickness including the cover glass 30 and the display panel PNL decreases at a constant rate as the distance from the light source LS increases along the first direction X. As a result, the difference in luminance between the area close to the light source LS and the area separated from the light source LS can be reduced.

Furthermore, in the present embodiment, since the main surface 40A extends along the direction D1 as well as the main surface 30B, the main surface 30B is parallel to the main surface 40A when the cover glass 30 and the cover glass 40 are attached to the display panel PNL, and the attachment of the cover glass 30 and the cover glass 40 can easily be therefore performed. Incidentally, the low-refractive layer 60 described in the fifth embodiment may also be applied in the present embodiment.

As described above, according to each of the embodiments, a display device DSP and the cover glasses 30 and 40 capable of suppressing the degradation in display quality can be provided.

Incidentally, other shapes may be applied to the cover glasses 30 and 40 in addition to the shapes described in the above-described embodiments. The shapes applicable to the cover glass 30 will be described below, but the shapes can also be applied to the cover glass 40.

FIG. 16 is a cross-sectional view schematically showing an example of a shape applicable to the cover glass 30. The main surface 30B has a first area A1 parallel to the main surface 30A and a second area A2 inclined to the main surface 30A. In the example shown in FIG. 16, the main surface 30B in the first area A1 is connected to the side surface 30C, and the main surface 30B in the second area A2 is connected to the side surface 30D.

The main surface 30B extends, for example, along the direction D1, in the second area A2. From another viewpoint, the cover glass 30 has an area where the thickness is constant in the first direction X and an area where the thickness decreases at a constant rate as the distance from the light source LS increases along the first direction X. In the example shown in FIG. 16, the first area A1 is located in the area close to the light source LS, and the second area A2 is located in the area separated from the light source LS.

In the first direction X, the size of the first area A1 may be larger or smaller than the size of the second area A2. The size of the first area A1 may be equal to the size of the second area A2. In the example shown in FIG. 16, one first area A1 and one second area A2 are formed, but are not limited to this example.

FIG. 17 is a cross-sectional view schematically showing another example of the shape applicable to the cover glass 30. The main surface 30B is concave and curved toward the main surface 30A. Incidentally, the main surface 30B may be concave and curved in a direction opposite to the example shown in FIG. 17.

Even when the cover glass 30 as described above is applied to each of the embodiments described above, the display device DSP capable of suppressing the degradation in display quality can be provided. In addition to the shapes described with reference to FIG. 16 and FIG. 17, the cover glass 30 may be formed in a staircase shape in which the thickness decreases in steps along the first direction X.

Furthermore, in the display device DSP of the second and sixth embodiments, the cover glass 30 may be formed as a flat plate substantially parallel to the X-Y plane. In this case, the thickness of the cover glass 30 is substantially constant in the first direction X.

In this case, since the display device DSP comprises the cover glass 40, the thickness of the display device DSP decreases at a constant rate as the distance from the light source LS increases along the first direction X. The display device DSP capable of suppressing the degradation in display quality can be therefore provided.

All of the display devices that can be implemented by a person of ordinary skill in the art through arbitrary design changes to the display devices described above as embodiments of the present invention come within the scope of the present invention as long as they are in keeping with the spirit of the present invention. Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a first substrate;
a second substrate opposed to the first substrate;
a liquid crystal layer provided between the first substrate and the second substrate;
a first cover member including a first main surface opposed to the second substrate, a second main surface on a side opposite to the first main surface, a first side surface connecting the first main surface with the second main surface, and a second side surface on a side opposite to the first side surface; and
a light source provided on the first substrate,
wherein
the first substrate, the second substrate, and the first cover member are stacked in a Z-direction,
the first side surface of the first cover member is closer to the light source compared to the second side surface of the first cover member in an X-direction crossing the Z-direction,
the first main surface of the first cover member includes a first position and a second position, the first position being closer to the first side surface of the first cover member compared to the second position in the X-direction, and
a first thickness of the first cover member at the first position in the Z-direction is different from a second thickness of the first cover member at the second position in the Z-direction.

2. The display device of claim 1, wherein
the first thickness of the first cover member at the first position in the Z-direction is greater than the second thickness of the first cover member at the second position in the Z-direction.

3. The display device of claim 2, wherein
the second main surface of the first cover member is an inclined surface that is inclined to the first main surface of the first cover member.

4. The display device of claim 2, further comprising:
a second cover member opposed to the first substrate, wherein
the second cover member includes a third main surface opposed to the first substrate, a fourth main surface on a side opposite to the third main surface, a third side surface that connects the third main surface with the fourth main surface, and a fourth side surface on a side opposite to the third side surface, the third side surface being closer to the first side surface of the first cover member compared to the fourth side surface in the X-direction.

5. The display device of claim 4, wherein
the light source emits light toward the first side surface of the first cover member.

6. The display device of claim 4, wherein
the light source emits light toward the third side surface of the second cover member.

7. The display device of claim 5, wherein
the third main surface of the second cover member includes a third position and a fourth position, the third position being closer to the third side surface of the second cover member compared to the fourth position in the X-direction, and
a third thickness of the second cover member at the third position in the Z-direction is different from a fourth thickness of the second cover member at the fourth position in the Z-direction.

8. The display device of claim 5, wherein
a thickness of the second cover member in the Z-direction is constant.

9. The display device of claim 7, further comprising:
a low-refractive layer formed on the first main surface of the first cover member and having a refractive index lower than a refractive index of the first cover member, wherein
a minimum distance between the light source and the second substrate in the Z-direction is greater than a minimum distance between the first main surface of the first cover member and the second substrate in the Z-direction.

10. The display device of claim 6, wherein
the third main surface of the second cover member includes a third position and a fourth position, the third position being closer to the third side surface of the second cover member compared to the fourth position in the X-direction, and
a third thickness of the second cover member at the third position in the Z-direction is greater than a fourth thickness of the second cover member at the fourth position in the Z-direction.

11. The display device of claim 6, wherein
a thickness of the second cover member in the Z-direction is constant.

12. The display device of claim 10, further comprising:
a low-refractive layer formed on the first main surface of the first cover member and having a refractive index lower than a refractive index of the first cover member.

13. The display device of claim 5, further comprising:
an adhesive layer bonding the first substrate with the second cover member, wherein
the third main surface of the second cover member includes a third position and a fourth position, the third position being closer to the third side surface of the second cover member compared to the fourth position in the X-direction,
a third thickness of the second cover member at the third position in the Z-direction is smaller than a fourth thickness of the second cover member at the fourth position in the Z-direction,
a refractive index of the adhesive layer is smaller than a refractive index of the first substrate, and
the second main surface of the first cover member is parallel to the fourth main surface of the second cover member.

14. The display device of claim 1, wherein
the liquid crystal layer is a polymer dispersed liquid crystal layer capable of changing a state in which incident light is transmitted and a state in which light is scattered, in accordance with a voltage to be applied.

15. A display device comprising:
a display panel displaying an image;
a first cover member overlapping with the display panel and including a first side surface and a first main surface, the first main surface opposed to the display panel; and
a light source opposed to the first side surface of the first cover member, wherein
the display panel and the first cover member are stacked in a Z-direction,
the first main surface of the first cover member includes a first position and a second position, the first position being closer to the first side surface of the first cover member compared to the second position in an X-direction crossing the Z-direction, and
a first thickness including a thickness of the first cover member and a thickness of the display panel at the first position in the Z-direction is different from a second thickness including a thickness of the first cover member and a thickness of the display panel at the second position in the Z-direction.

16. The display device of claim 15, wherein
the first thickness including the thickness of the first cover member and the thickness of the display panel at the first position in the Z-direction is greater than the second thickness including the thickness of the first cover member and the thickness of the display panel at the second position in the Z-direction.

17. A display device comprising:
a first substrate;
a second substrate opposed to the first substrate, the first substrate including an extending portion in which the first substrate does not overlap with the second substrate;
a liquid crystal layer provided between the first substrate and the second substrate;
a first cover member including a first main surface opposed to the second substrate, a second main surface on a side opposite to the first main surface, a first side surface connecting the first main surface with the second main surface, and a second side surface on a side opposite to the first side surface; and
a light source provided on the extending portion of the first substrate,
wherein
the first substrate, the second substrate, and the first cover member are stacked in a Z-direction, the first side surface of the first cover member is closer to the extending portion of the first substrate compared to the second side surface of the first cover member in an X-direction crossing the Z-direction,
the first main surface of the first cover member includes a first position and a second position, the first position being closer to the first side surface of the first cover member compared to the second position in the X-direction, and
a first thickness of the first cover member at the first position in the Z-direction is different from a second thickness of the first cover member at the second position in the Z-direction.

18. The display device of claim 17, wherein
the first thickness of the first cover member at the first position in the Z-direction is greater than the second thickness of the first cover member at the second position in the Z-direction.

19. The display device of claim 18, wherein
the second main surface of the first cover member is an inclined surface that is inclined to the first main surface of the first cover member.

20. The display device of claim 17, wherein
a thickness of the first cover member in the Z-direction gradually decreases from the first position to the second position.

* * * * *